(12) United States Patent
Kim et al.

(10) Patent No.: US 9,529,471 B2
(45) Date of Patent: Dec. 27, 2016

(54) MOBILE TERMINAL AND CONTROL METHOD THEREOF

(71) Applicant: Samsung Electronics Co., Ltd., Gyeonggi-do (KR)

(72) Inventors: Mooyoung Kim, Seoul (KR); Hongseok Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 14/280,470

(22) Filed: May 16, 2014

(65) Prior Publication Data

US 2014/0340338 A1  Nov. 20, 2014

(30) Foreign Application Priority Data

May 16, 2013  (KR) .................. 10-2013-0055583

(51) Int. Cl.
*G06F 3/041* (2006.01)
*G06F 3/0488* (2013.01)

(52) U.S. Cl.
CPC ............ *G06F 3/0416* (2013.01); *G06F 3/041* (2013.01); *G06F 3/0488* (2013.01)

(58) Field of Classification Search
CPC combination set(s) only.
See application file for complete search history.

(56) References Cited

U.S. PATENT DOCUMENTS

| | | | |
|---|---|---|---|
| 8,373,660 B2 | 2/2013 | Pallakoff | |
| 8,692,778 B2 | 4/2014 | Kim | |
| 8,713,463 B2 | 4/2014 | Kim et al. | |
| 2005/0012723 A1 | 1/2005 | Pallakoff | |
| 2009/0174679 A1* | 7/2009 | Westerman | G06F 3/041 345/173 |
| 2009/0184935 A1 | 7/2009 | Kim | |
| 2010/0079395 A1* | 4/2010 | Kim | G06F 1/1626 345/173 |
| 2010/0138680 A1* | 6/2010 | Brisebois et al. | 713/324 |
| 2012/0011438 A1 | 1/2012 | Kim et al. | |
| 2012/0075212 A1* | 3/2012 | Park et al. | 345/173 |
| 2012/0313872 A1* | 12/2012 | Zhang et al. | 345/173 |
| 2013/0009915 A1 | 1/2013 | Hering | |

(Continued)

FOREIGN PATENT DOCUMENTS

| | | |
|---|---|---|
| EP | 2175344 A2 | 4/2010 |
| EP | 2434385 A2 | 3/2012 |
| KR | 1020090079405 A | 7/2009 |

OTHER PUBLICATIONS

Extended European Search Report dated Feb. 6, 2015 in connection with European Application No. 14167794.8; 7 pages.

*Primary Examiner* — Jason Olson
*Assistant Examiner* — Sosina Abebe

(57) ABSTRACT

One or more embodiments provide a mobile terminal and a control method for setting a touch ignoring region on a touch screen of the mobile terminal. In the method, the mobile terminal detects a user's grip signal from at least one lateral side thereof. Then, based on the grip signal, the mobile terminal sets a touch ignoring region on the touch screen. In embodiments, the mobile terminal checks a gripped state thereof through a sensor and then sets the touch ignoring region. This not only prevents a wrong operation caused by an unintended touch due to a thin bezel of the mobile terminal, but also obviates any inconvenience.

15 Claims, 17 Drawing Sheets

(56) References Cited

U.S. PATENT DOCUMENTS

2014/0168135 A1\* 6/2014 Saukko .............. G06F 1/1684
　　　　　　　　　　　　　　　　　　　　　345/174
2014/0289655 A1　9/2014 Park et al.

\* cited by examiner

[a]  [b]

MOBILE TERMINAL AND CONTROL METHOD THEREOF

CROSS-REFERENCE TO RELATED APPLICATION(S) AND CLAIM OF PRIORITY

The present application is related to and claims the benefit under 35 U.S.C. §119(a) of a Korean patent application filed on May 16, 2013 in the Korean intellectual property office and assigned Serial No. 10-2013-0055583, the entire disclosure of which is hereby incorporated by reference.

TECHNICAL FIELD

The present disclosure relates to a mobile terminal and control method for setting a touch ignoring region on a touch screen.

BACKGROUND

So-called terminals, which are a sort of electronic devices, may be classified into mobile terminals (also referred to as portable terminals) and stationary terminals according to their movability or not. Further, mobile terminals may be classified into handheld terminals and vehicle mount terminals according to their portability by users.

Recently these terminals have evolved into multimedia players that have the ability to perform multiple functions such as a digital camera, a music player, a game player, a broadcast receiver, and the like. For support and enhance the functionality of such terminals, improvements in structure and software of the terminals are now considered in the art.

In order to offer a great amount of information including high-definition images to users, a display unit equipped in a mobile terminal is increasing in size and thus the mobile terminal itself is also increasing in size. However, an increased size of the mobile terminal may deteriorate the portability of the mobile terminal and a feeling of user's grip. To obviate this problem, some of conventional mobile devices include thin edges, often referred to as a bezel, enclosing a display unit while the display unit is kept in an increased size.

FIGS. 1 and 2 show the front side of a conventional mobile terminal.

Referring first to FIG. 1, a user who uses a mobile terminal 10 including a touch screen 11 grips the mobile terminal 10. In this embodiment, due to a small width of a bezel, an unintended touch may often happen on the touch screen 11. For example, when a user grips the mobile terminal 10 by the left hand as shown, the user's left thumb may touch a certain part 13 of the touch screen 11 regardless of user's intention.

This unintended touch which occurs on a certain part 13 of the touch screen 11 as shown in FIG. 1 may often cause a wrong operation of the mobile terminal 10. Additionally, even though a user takes any intended touch action together with this unintended touch, the mobile terminal 10 may not perform a particular function in response to a user's intended touch action.

Referring to FIG. 2, a mobile terminal 20 may include a touch ignoring region 23 at a peripheral zone of a touch screen 21. Namely, the touch ignoring region 23 performs a display function like the other part of the touch screen 21, but ignores a touch input unlike the other part. This may prevent a wrong operation caused by an unintended touch on the touch ignoring region 23.

However, when user uses the mobile terminal 20 without a grip, e.g., when the mobile terminal 20 is placed on the palm of a hand or any other flat, the mobile terminal 20 may fail to recognize a touch input on the touch ignoring region 23. Unfortunately, this may invite user's inconvenience.

SUMMARY

To address the above-discussed deficiencies, it is a primary object to provide advanced technique to set a touch ignoring region on a touch screen of a mobile terminal, depending on a gripped state of the mobile terminal. This not only prevents a wrong operation caused by an unintended touch due to a thin bezel of the mobile terminal, but also obviates any inconvenience.

An embodiment in this disclosure may provide a method for controlling a mobile terminal including a touch screen. This method comprises detecting a user's grip signal from at least one lateral side of the mobile terminal; and setting a touch ignoring region on the touch screen, based on the grip signal.

The setting of the touch ignoring region may include determining whether a value of the grip signal is equal to or greater than a predefined value; and if the value of the grip signal is equal to or greater than the predefined value, setting the touch ignoring region based on the grip signal.

The detecting of the grip signal may include detecting a touch signal from the lateral side of the mobile terminal.

The setting of the touch ignoring region may include determining whether the touch signal is received from the lateral side of the mobile terminal for a given time or more; and if the touch signal is received for the given time or more, setting the touch ignoring region based on the touch signal.

The setting of the touch ignoring region may include recognizing a specific portion of the lateral side of the mobile terminal from which the touch signal is detected; and setting the touch ignoring region based on the specific portion.

The detecting of the grip signal may include detecting a pressure signal from the lateral side of the mobile terminal.

The setting of the touch ignoring region may include measuring strength of the pressure signal; determining whether the measured strength is equal to or greater than a given strength; and if the measured strength is equal to or greater than the given strength, setting the touch ignoring region based on the pressure signal.

The setting of the touch ignoring region may include measuring strength of the pressure signal; and setting the touch ignoring region based on the strength of the pressure signal.

The setting of the touch ignoring region may include recognizing a specific portion from which the pressure signal is detected; and setting the touch ignoring region based on the specific portion.

The setting of the touch ignoring region may include recognizing a specific portion from which the pressure signal is detected; measuring strength of the pressure signal; and setting the touch ignoring region based on both the specific portion and the strength of the pressure signal.

The method may further comprise determining whether the grip signal is removed; and if the grip signal is removed, releasing the touch ignoring region.

The detecting of the grip signal may include detecting the grip signal from a peripheral zone of the touch screen of the mobile terminal.

Another embodiment in this disclosure may provide a mobile terminal that comprises a display unit including a touch screen; a sensor unit configured to detect a user's grip signal from at least one lateral side of the mobile terminal; and a control unit configured to set a touch ignoring region on the touch screen, based on the grip signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 3 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a signal" includes reference to one or more of such signals.

In the present disclosure, a mobile terminal may include, but not limited to, a mobile phone, a smart phone, a notebook, a laptop computer, a tablet computer, a digital broadcasting terminal, a personal digital assistant (PDA), a portable multimedia player (PMP), a navigation terminal, a media player, a mobile medical device, a digital camera, a portable game console, an electronic dictionary, an electronic scheduler, a wearable device, and any other equivalents. As will be understood by those skilled in the art, some technique in this disclosure may be favorably applied to stationary terminals such as a digital TV, a desktop computer, and the like.

Figure 1:
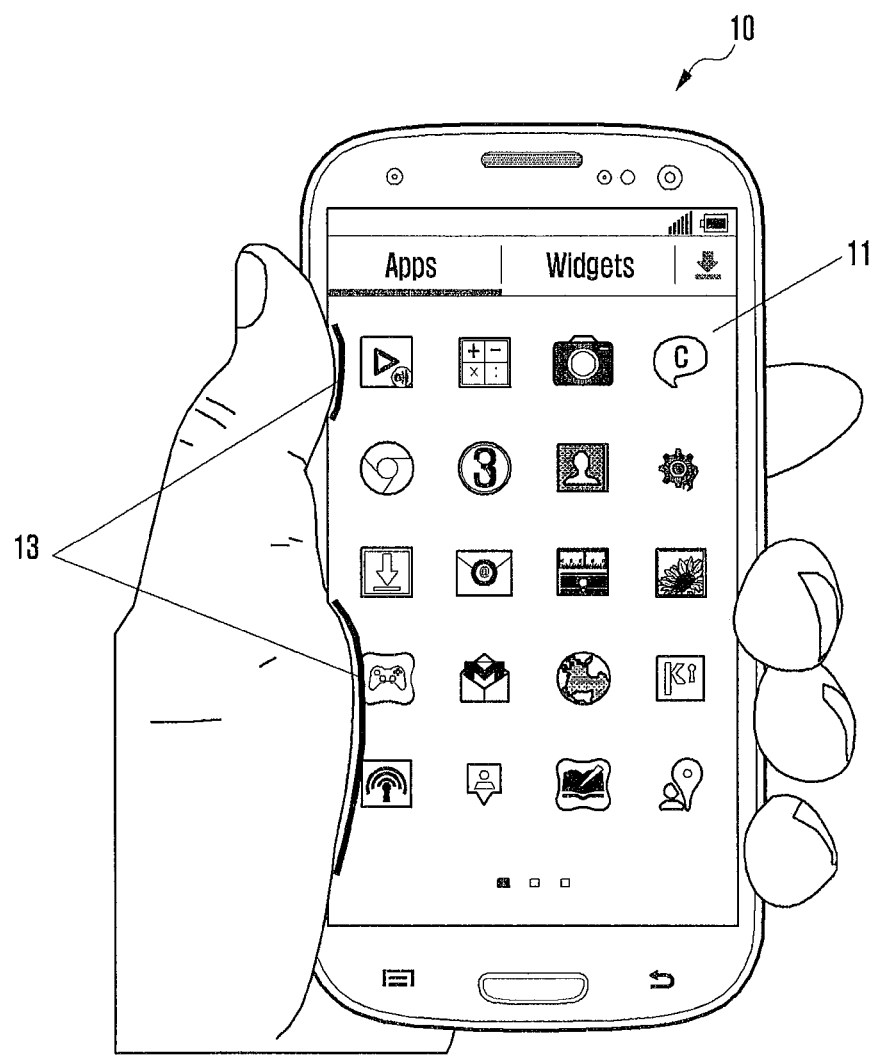
FIGS. 1 and 2 illustrate the front side of a conventional mobile terminal.
Figure 2:
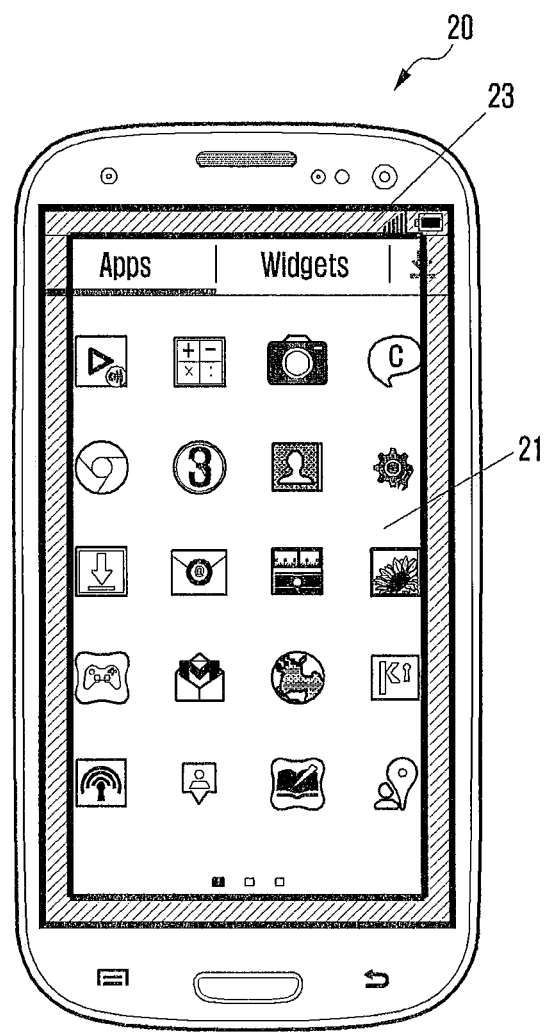
Figure 3:
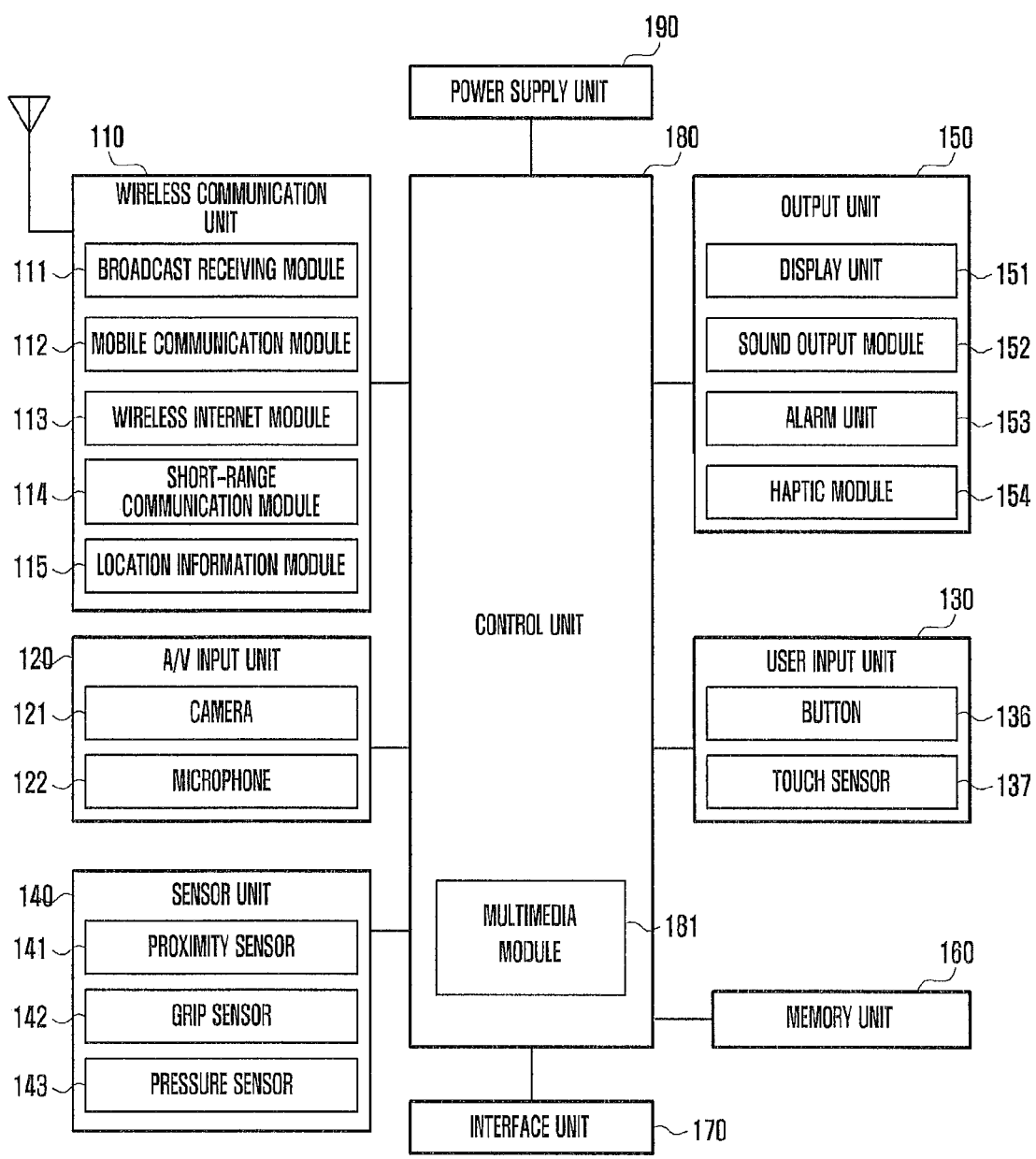
FIG. 3 illustrates a block diagram showing a mobile terminal in accordance with an embodiment of the present disclosure.

FIG. 3 illustrates a block diagram showing a mobile terminal in accordance with an embodiment of the present disclosure.

Referring to FIG. 3, the mobile terminal 100 may include a wireless communication unit 110, an audio/video (A/V) input unit 120, user input unit 130, a sensor unit 140, an output unit 150, a memory unit 160, an interface unit 170, a control unit 180, and a power supply unit 190. These elements of the mobile terminal 100 shown in FIG. 3 may be essential or optional, and some of them may be selectively replaced with any other equivalent.

Now, each element will be described in detail.

The wireless communication unit 110 may include one or more modules that allow a wireless communication between the mobile terminal 100 and a wireless communication system or between the mobile terminal 100 and a network where the mobile terminal 100 is located. For example, the wireless communication unit 110 may include a broadcast receiving module 111, a mobile communication module 112, a wireless internet module 113, a short-range communication module 114, a location information module 115, and the like. In some embodiments, the wireless communication unit 110 may not be essential.

The broadcast receiving module 111 receives a broadcasting signal and/or related information from an external broadcasting management server through a broadcast channel. The broadcast channel may include, but not limited to, a satellite channel and a terrestrial channel. To allow a simultaneous broadcast reception for two or more broadcast channels or a switching between such channels, two or more broadcast receiving modules may be provided to the mobile terminal 100.

The broadcast management server may be a server that creates and transmits a broadcasting signal and/or related information, or a server that receives a created broadcasting signal and/or related information and transmits the received signal and/or information to the terminal. A broadcasting signal may be a TV broadcasting signal, a radio broadcasting signal, a data broadcasting signal, or any combination thereof.

Broadcasting-related information may be any information associated with a broadcast channel, a broadcast program, or a broadcast service provider. In some embodiments, this information may be provided through a mobile communication network and received by the mobile communication module 112.

Broadcasting-related information may include various forms such as EPG (Electronic Program Guide) of DMB (Digital Multimedia Broadcasting) or ESG (Electronic Service Guide) of DVB-H (Digital Video Broadcast-Handheld).

The broadcast receiving module 111 may receive a digital broadcasting signal using a well-known digital broadcasting system such as DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), DVB-CBMS (Convergence of Broadcasting and Mobile Service), OMA-BCAST (Open Mobile Alliance-BroadCAST), CMMB (China Multimedia Mobile Broadcasting), MBBMS (Mobile Broadcasting Business Management System), and ISDB-T (Integrated Services Digital Broadcast-Terrestrial). Of course, the broadcast receiving module 111 may be configured to be suitable for any other broadcasting system as well as the above digital broadcasting systems.

A broadcasting signal and/or related information received through the broadcast receiving module 111 may be stored in the memory unit 160.

The mobile communication module 112 transmits or receives a wireless signal to or from at least one of a base station, other terminal, and a server on a mobile communication network including, but not limited to, GSM (Global System for Mobile communications), CDMA (Code Division Multiple Access), or WCDMA (Wideband CDMA). This wireless signal may include a voice call signal, a video call signal, text/multimedia message data, and the like.

The wireless internet module 113 may be configured for a wireless internet access, being equipped in or attached to the mobile terminal 100. As wireless internal technology, WLAN (Wireless LAN) (also referred to as Wi-Fi), Wibro (Wireless broadband), Wimax (World Interoperability for Microwave Access), HSDPA (High Speed Downlink Packet Access), GSM, CDMA, WCDMA, or LTE (Long Term Evolution) may be used.

Considering that a wireless internet access based on Wibro, HSDPA, GSM, CDMA, WCDMA, LTE, or the like is made through a mobile communication network, the wireless internet module 113 may be understood as a sort of the mobile communication module 112.

The short-range communication module 114 is a specific module suitable for a short-range communication. Short-range communication technology may include, but not limited to, Bluetooth, RFID (Radio Frequency Identification), IrDA (Infrared Data Association, UWB (Ultra WideBand), ZigBee, or the like.

The location information module 115 is a specific module for acquiring the location of the mobile terminal. According to typical technology, normally used is a GPS (Global Positioning System) module which calculates its position by precisely timing the signals sent by GPS satellites. A calculated result may include latitude, longitude and altitude information. In current GPS operation, four or more satellites may be used to further obtain velocity information.

The A/V input unit 120 is configured to enter an audio signal and/or a video signal, including a camera 121, a microphone 122, and the like. The camera 121 obtains an image frame such as a still image or a moving image through an image sensor in a video call mode or a camera mode and then processes it. The processed image frame may be displayed on a display unit 151. In some embodiments, the A/V input unit 120 may not be essential.

The image frame processed by the camera 121 may be stored in the memory unit 160 or transmitted to an external entity through the wireless communication unit 110. Depending on usage environments, the camera 121 may be two or more.

The microphone 122 receives an external sound in a call mode, a recording mode, or a speech recognition mode and then processes it as electric sound data. In a call mode, the sound data may be converted into a transmittable form and sent to a base station through the mobile communication module 112. In the microphone 122, various noise removal algorithms for removing noise contained in an external sound may be realized.

The user input unit 130 is configured to receive a user's input action and then create corresponding input data for controlling the operation of the mobile terminal 100. The user input unit 130 may be composed of a button 136 disposed at front, rear and/or lateral sides of the mobile terminal 100, and a touch sensor 137. Although not shown, the user input unit 130 may further include a keypad, a dome switch, a jog wheel, a jog switch, or the like.

The sensor unit 140 detects a current status of the mobile terminal 100, such as an open or close state of the mobile terminal 100, the location of the mobile terminal 100, a user's contact with the mobile terminal 100, the direction of the mobile terminal 100, and acceleration or deceleration of the mobile terminal 100, and then creates a sensing signal for controlling the operation of the mobile terminal 100. For example, when mobile terminal 100 is a slide phone type, the sensor unit 140 may sense whether the slide phone is opened or closed. Additionally, the sensor unit 140 may sense whether the power supply unit 190 supplies electric power or whether the interface unit 170 is connected to any external device. The sensor unit 140 may include, but not limited to, a proximity sensor 141, a grip sensor 143, and a pressure sensor 145.

The proximity sensor 141 detects the approach or existence of an object toward or near a specific sensitive surface without any mechanical contact by using electromagnetic force or infrared rays. Normally the proximity sensor 141 has a longer life and a wider usage than a contact type sensor.

As examples of the proximity sensor 141, a transmission type photoelectric sensor, a direct reflection type photoelectric sensor, a mirror reflection type photoelectric sensor, a high-frequency oscillation type proximity sensor, a capacitive type proximity sensor, a magnetic proximity sensor, an infrared proximity sensor, and the like are well known in the art.

Hereinafter, for the sake of illustration, an action to place an approaching, but not contacted, pointer over the touch screen may be referred to as "a proximity touch", and an action to actually put a pointer into contact with the touch screen may be referred to as "a contact touch". The location of a proximity touch by a pointer over the touch screen may be defined as the location of orthographic projection from a pointer on the touch screen. In this disclosure, the term "a touch" may include a proximity touch as well as a contact touch.

In some embodiments, a proximity touch may include a so-called hovering input.

The proximity sensor 141 detects a proximity touch and a proximity touch pattern (e.g., distance, direction, velocity, time, position, moving state, and the like of a proximity touch). Detected information may be outputted on the touch screen.

The grip sensor 143 may be disposed at one or more lateral sides of the mobile terminal 100 in order to determine whether the mobile terminal 100 is gripped. In some embodiments, the grip sensor 143 may be a touch sensor. For example, when a user's hand is touched on the lateral side of the mobile terminal 100, the grip sensor 143 may convert a pressure applied to the lateral side or a variation of capacitance on the lateral side into an electric signal. When a touch signal is entered into the grip sensor 143, the control unit 180 may recognize that the mobile terminal 100 is gripped by a user's hand or the like. Additionally, the grip sensor 143 may be configured to further detect a touch position and area. The grip sensor 143 may be formed of two or more sensors.

In some embodiments, the grip sensor 143 may be further disposed at a peripheral zone of the display unit 151. In this embodiment, if a part of the peripheral zone is touched by a user's hand or the like, the grip sensor 143 may detect a touch signal and then inform the control unit 180 that a touch signal is detected. Therefore, based on such a touch signal received from the grip sensor 143, the control unit 180 may recognize that the mobile terminal 100 is gripped. If necessary, the control unit 180 may obtain the position and area of grip.

In some embodiments, a touch signal entered into the grip sensor 143 may result from a proximity touch. Namely, like the proximity sensor 141, the grip sensor 143 may detect a proximity touch. For example, when grip sensor 143 is disposed at a peripheral zone of the display unit 151, and if a proximity touch rather than a contact touch happens at a part of the peripheral zone, the control unit 180 may recognize that the mobile terminal 100 is gripped. In this embodiment, only when a proximity touch happens within a given distance, it may be determined that the mobile terminal 100 is gripped. In some embodiments, the proximity sensor 141 may be separately disposed at the display unit 151 to detect a proximity touch while the grip sensor 143 may detect a contact touch from the lateral side of the mobile terminal 100. In this embodiment, based on any detection by either sensor, it may be determined that the mobile terminal 100 is gripped.

In some embodiments, the grip sensor 143 may be disposed at the rear side of the mobile terminal 100 in order to detect whether the rear side of the mobile terminal 100 is gripped by a user's hand. A detected input signal may be transmitted to the control unit 180. The grip sensor 143 disposed at the rear side may be formed of a proximity sensor, which may determine whether any object such as a user's hand is detected within a given distance from the rear side of the mobile terminal 100. In some embodiments, when a touch signal is entered into the grip sensor 143 disposed at the lateral side of the mobile terminal 100 and further when a signal is entered into at least part of the grip sensor 143 disposed at the rear side of the mobile terminal 100, the control unit 180 may determine that the mobile terminal 100 is gripped.

The pressure sensor 145 may be disposed at least one lateral side of the mobile terminal 100 in order to determine whether the mobile terminal 100 is gripped. Namely, the pressure sensor 145 may detect a pressure applied to the lateral side of the mobile terminal 100. Further, the pressure sensor 145 may be configured to detect the location and size of pressure. The pressure sensor 145 may convert a pressure signal into an electric signal and transmit it to the control unit 180. Then the control unit 180 may determine whether the mobile terminal 100 is gripped, depending on the location and size of pressure. The pressure sensor 145 may be formed of two or more sensors.

The output unit 150 is configured to create a visual, auditory, or tactile output. The output unit 150 may include, but not limited to, a display unit 151, a sound output module 152, an alarm unit 153, and a haptic module 154.

The display unit 151 displays information processed by the mobile terminal 100. For example, when mobile terminal 100 is in a call mode, the display unit 151 displays a specific UI (User Interface) or a specific GUI (Graphic UI) in connection with a call mode. When mobile terminal 100 is in a video call mode or a camera mode, the display unit 151 displays a captured or received image, a specific UI, or a specific GUI.

The display unit 151 may include, but not limited to, an LCD (Liquid Crystal Display), a TFT LCD (Thin Film Transistor LCD), an OLED (Organic Light Emitting Diode), a flexible display, a three-dimensional display, or the like.

Some of the above displays may be formed of a transparent type or a light-transmittable type. This may be referred to as a transparent display, e.g., a TOLED (Transparent OLED). Also, a rear structure of the display unit 151 may be formed of light-transmittable structure. In this embodiment, a user can therefore see any object located behind a terminal body through the display unit 151.

In some embodiments, two or more display units 151 may be used. Such display units may be disposed separately or in combination at the same side or disposed respectively at different sides.

When display unit 151 and the touch sensor 137 are structured in layers or unified as well-known as a touch screen, the display unit 151 may be used for an input device as well as an output device. If the touch sensor 137 is formed of a touch film, a touch sheet, a touch pad, or the like, the touch sensor may be stacked on or under the display unit 151 to realize a layered structure or unified into the display unit 151.

The touch sensor 137 may be configured to convert a pressure applied to or a variation of capacitance occurring at a certain spot of the display unit 151 into an electric input signal. This touch sensor may be configured to detect a touch pressure as well as the location and area of touch.

When there is a touch input to the touch sensor 137, a corresponding signal is sent to a touch controller (not shown). Then the touch controller processes the received signal and transmits resultant data to the control unit 180. Therefore, the control unit 180 can recognize which spot of the display unit 151 is touched.

The proximity sensor 141 may be disposed inside the mobile terminal 100 covered with the touch screen or disposed near the touch screen. When a capacitive type, the touch screen is configured to detect an approaching pointer on the basis of changes in an electric field. In this embodiment, the touch screen may be regarded as a proximity sensor.

The sound output module 152 may output audio data received through the wireless communication unit 110 or stored in the memory unit 160 in a call mode, a recording mode, a speech recognition mode, a broadcast receiving mode, and the like. The sound output module 152 may also output a sound signal (e.g., an incoming call ringtone, an incoming message reception tone, and the like) associated with a particular function performed in the mobile terminal 100. The sound output module 152 may be formed including or in combination with a receiver, a speaker, a buzzer, and the like.

The alarm unit 153 outputs a signal for the feedback of a specific event that occurs at the mobile terminal 100. An event of the mobile terminal 100 may be, for example, the arrival of an incoming call, the reception of an incoming message, a key input, a touch input, and the like. The alarm unit 153 may output a feedback signal associated with any event by means of a vibration rather than a video or audio signal. Since a video or audio signal may be also outputted through the display unit 151 or the sound output unit 152, the display unit 151 and the sound output unit 152 may be regarded as a sort of the alarm unit 153.

The haptic module 154 creates various tactile effects, e.g., a vibration, which can be felt by a user. The strength and pattern of vibration created by the haptic module 154 may be controlled. For example, different vibration patterns may be outputted in combination or sequentially.

In addition to a vibration, the haptic module 154 may create any other tactile effect that results from the arrangement of pins vertically moving with regard to a skin surface, a jet or suction force of air through a jet or suction orifice, a gentle brush on a skin surface, contact with electrode, stimulation by an electrostatic force, a cold or warm feeling by an endothermic or exothermic device, or the like.

The haptic module 154 may transmit a tactile effect through direct contact, and also may be realized to allow a user to feel a tactile effect through the sense of muscle such as a user's finger or arm. Depending on types of the mobile terminal 100, two or more haptic modules 154 may be used together.

The memory unit 160 may store a program designed for a processing and control function of the control unit 180 and also temporarily store input/output data (e.g., a phonebook, message, audio, still image, video, and the like). The memory unit 160 may further store a using log and frequency of each data (e.g., a call log and frequency of each phone number, a message log and frequency of each phone number, a playback log and frequency of each multimedia, or the like).

Additionally, the memory unit 160 may store data regarding a vibration and sound of various patterns produced by a touch input on the touch screen.

The memory unit 160 may include, but not limited to, at least one of a flash memory, a hard disk, a multimedia card micro, a card type memory (e.g., SD or XD memory), RAM (Random Access Memory), SRAM (Static RAM), ROM (Read Only Memory), PROM (Programmable ROM), EEPROM (Electrically Erasable PROM), a magnetic memory, a magnetic disk, an optical disk, and their equivalents. In some embodiments, the mobile terminal 100 may operate in connection with a web storage that performs a storage function of the memory unit 160 on the Internet.

The interface unit 170 acts as a path to and from all kinds of external devices connected to the mobile terminal 100. The interface unit 170 receives data from any external device, delivers electric power to respective elements in the mobile terminal 170, or transmits data in the mobile terminal 100 to a selected external device. For example, the interface unit 170 may include a wired/wireless headset port, an external recharger port, a wired/wireless data port, a memory card port, a specific port for connecting any device having an identity module, an audio I/O (input/output) port, a video I/O port, an earphone port, and the like.

An identity module is a specific chip that stores various kinds of information for authenticating a using authority of the mobile terminal 100, and may include UIM (User Identity Module), SIM (Subscriber Identity Module), USIM (Universal SIM), or the like. Such an identity module may be manufactured in the form of a smart card, which may be connected to the mobile terminal 100 through a suitable port.

When the mobile terminal 100 is connected to any external cradle, the interface unit 170 may become a path for supplying electric power from the cradle to the mobile terminal 100 or a path for delivering various command signals entered by a user at the cradle to the mobile terminal 100. In this embodiment, electric power or various command signals may act as a signal for indicating that the mobile terminal 100 is correctly mounted on the cradle.

The control unit 180 controls in general the whole operation of the mobile terminal 100. For example, the control unit 180 performs a control and processing function associated with a voice call, a data communication, a video call, and the like. Also, the control unit 180 may include a multimedia module 181 for playback of multimedia. The multimedia module 181 may be formed within or separately from the control unit 180.

Additionally, the control unit 180 may perform a pattern recognition process for recognizing a handwritten or picture-drawing input made on the touch screen as text or image.

The power supply unit 190 receives external or internal electric power and then supplies such electric power to each element under the control of the control unit 180. The power supply unit 190 may include, for example, a battery, a coupling port, a power supply controller, and a recharge monitoring unit.

The battery may be a rechargeable built-in battery and also detachable from a terminal body. The coupling port may be formed as one example of the interface unit 170 to which an external charger for charging the battery is connected.

A variety of embodiments disclosed herein may be often implemented using software, hardware, or combination thereof in a recording medium that can be read by a computer or any other similar device.

When implementation is based on hardware, embodiments disclosed herein may be implemented using at least one of ASIC (Application Specific Integrated Circuit), DSP (Digital Signal Processor), DSPD (Digital Signal Processing Device), PLD (Programmable Logic Device), FPGA (Field Programmable Gate Array), a processor, a controller, a microcontroller, a microprocessor, and any other electronic unit for performing a particular function. Some embodiments may be implemented using the control unit 180.

When implementation is based on software, embodiments disclosed herein may be implemented by means of separate software modules. Each software module may perform one or more functions and processes discussed herein. A software code may be implemented as a software application based on a suitable program language, stored in the memory unit 160, and executed by the control unit 180.

Figure 4:
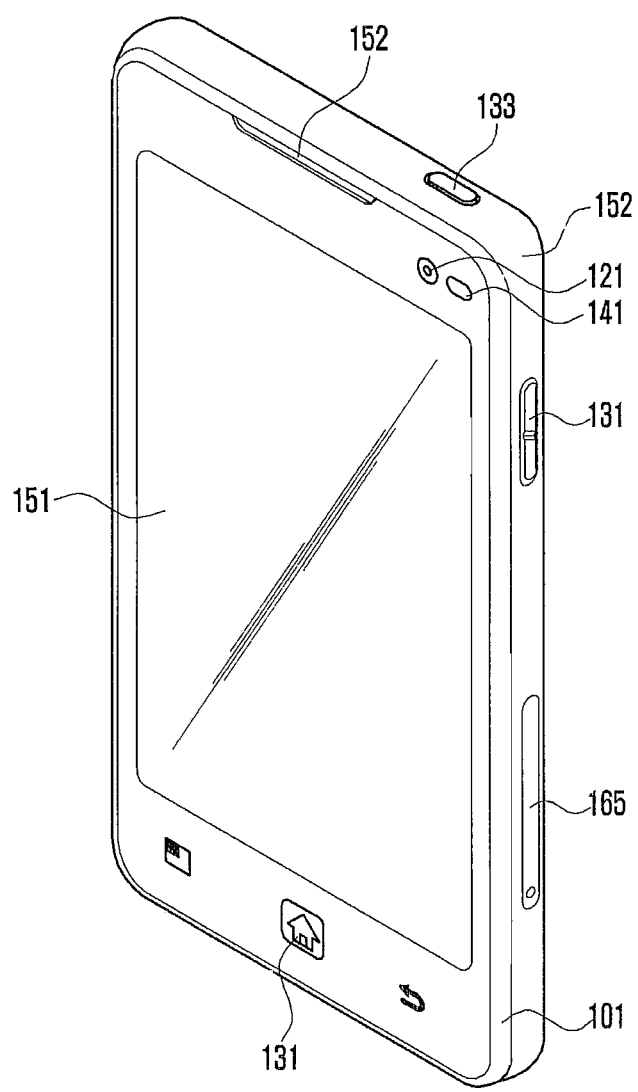
FIG. 4 illustrates a perspective view showing the front side of a mobile terminal in accordance with an embodiment of the present disclosure.

FIG. 4 illustrates a perspective view showing the front side of a mobile terminal in accordance with an embodiment of the present disclosure.

Figure 5:
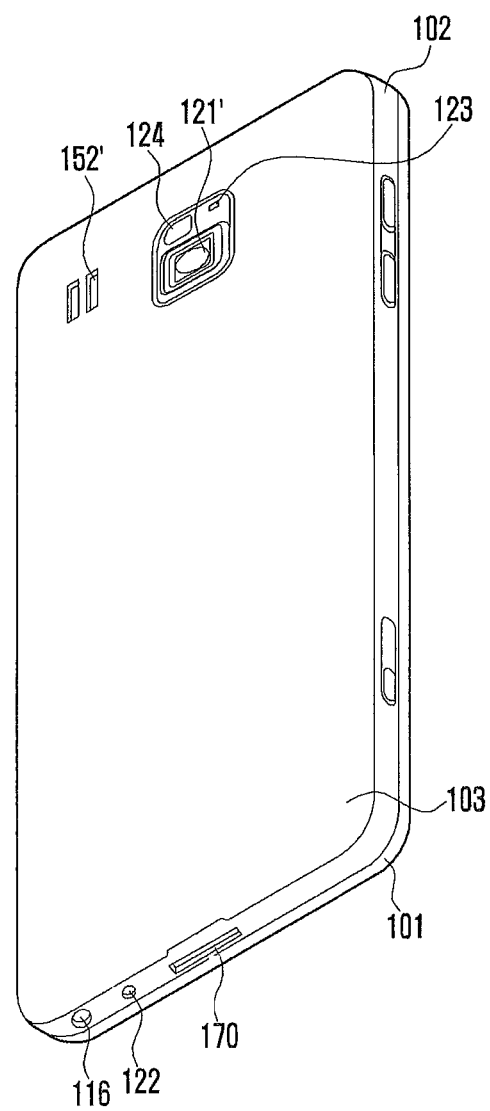
FIG. 5 illustrates a perspective view showing the rear side of a mobile terminal in accordance with an embodiment of the present disclosure.

Referring to FIGS. 3 to 5, the mobile terminal 100 has a bar-shaped terminal body. Alternatively, the terminal body may be formed of a slide type, a folder type, a swing type, a swivel type, or any other type.

The terminal body may be composed of a front case 101 and a rear case 102. An inner space between the front case 101 and the rear case 102 contains a great variety of electronic components.

A supplementary storage medium 165 such as a USIM card or a memory card may be inserted into or removed from a corresponding opening of the terminal body. In some embodiments, the supplementary storage medium 165 may be inserted into a suitable slot formed at the lateral side of the terminal body, or attached to a card slot formed at the surface of the rear case 102.

The front and rear cases 101 and 102 may be formed of injected synthetic resin or metallic material such as stainless steel or titanium.

On the front and rear cases 101 and 102, the display unit 151, the sound output unit 152, the camera 121, the user input unit 130 (i.e., 131, 132 and 133), the microphone 122, and the interface unit 170 may be disposed.

The display unit 151 occupies most parts of the main surface of the front case 101. The sound output unit 152 and the camera 121 are disposed near one shorter end of the display unit 151 on the front case 101, and the user input unit 131 is disposed near the other shorter end on the front case 101. The microphone 122, the user input unit 132 and 133, the supplementary storage medium 165, the interface unit 170, and the antenna 116 may be disposed on lateral sides of the rear case 102 as also shown in FIG. 5.

The user input unit 130 may include a plurality of manipulating units, also referred to as manipulating portions, 131, 132 and 133 which receive commands for controlling the operation of the mobile terminal 100.

Commands received by each manipulating unit 131, 132 or 133 may be set variously. For example, the first manipulating unit 131 may receive a start, end, or scroll command. The second manipulating unit 132 may receive a volume regulating command. The third manipulating unit 133 may receive an activating or inactivating command of a touch recognition mode.

Such a manipulating unit 131, 132 or 133 may be formed of a button for detecting a user's pressure, or include a touch sensor for detecting a user's touch.

FIG. 5 illustrates a perspective view showing the rear side of a mobile terminal in accordance with an embodiment of the present disclosure.

Referring to FIG. 5, on the rear case 102 (i.e., on the back surface of the terminal body), another camera 121' (i.e., a rear camera) may be further equipped. A shooting direction of the rear camera 121' is opposite to that of the front camera (121 shown in FIG. 4). Pixels of the rear camera 121' may be the same as or different from those of the front camera 121.

For example, the front camera 121 is used to capture a user's face used for immediate transmission in a video call and thus has lower pixels. In contrast, the rear camera 121' is used to capture a subject used for no immediate transmission in a normal camera mode and thus has relatively higher pixels. Such cameras 121 and 121' may be installed on the terminal body so as to allow a rotation or pop-up.

A flash 123 and a mirror 124 may be disposed near the rear camera 121'. The flash 123 is used to throw a light toward a subject during normal shooting using the rear camera 121'. The mirror 124 reflects a user's face during self shooting using the rear camera 121'.

Additionally, another sound output unit 152' may be disposed on the rear case 102. This rear sound output unit 152' may perform a stereo function together with the front sound output unit (152 shown in FIG. 4), and also be used for a speaker phone mode.

On lateral sides of the terminal body, an antenna 116 for receiving a broadcast signal may be disposed in addition to another antenna for a call. This antenna 116 may form a part of the broadcast receiving module (111 shown in FIG. 3) and be extendable from the terminal body.

Now, various embodiments related to a control method implemented in the above-discussed mobile terminal will be described in detail.

Figure 6:
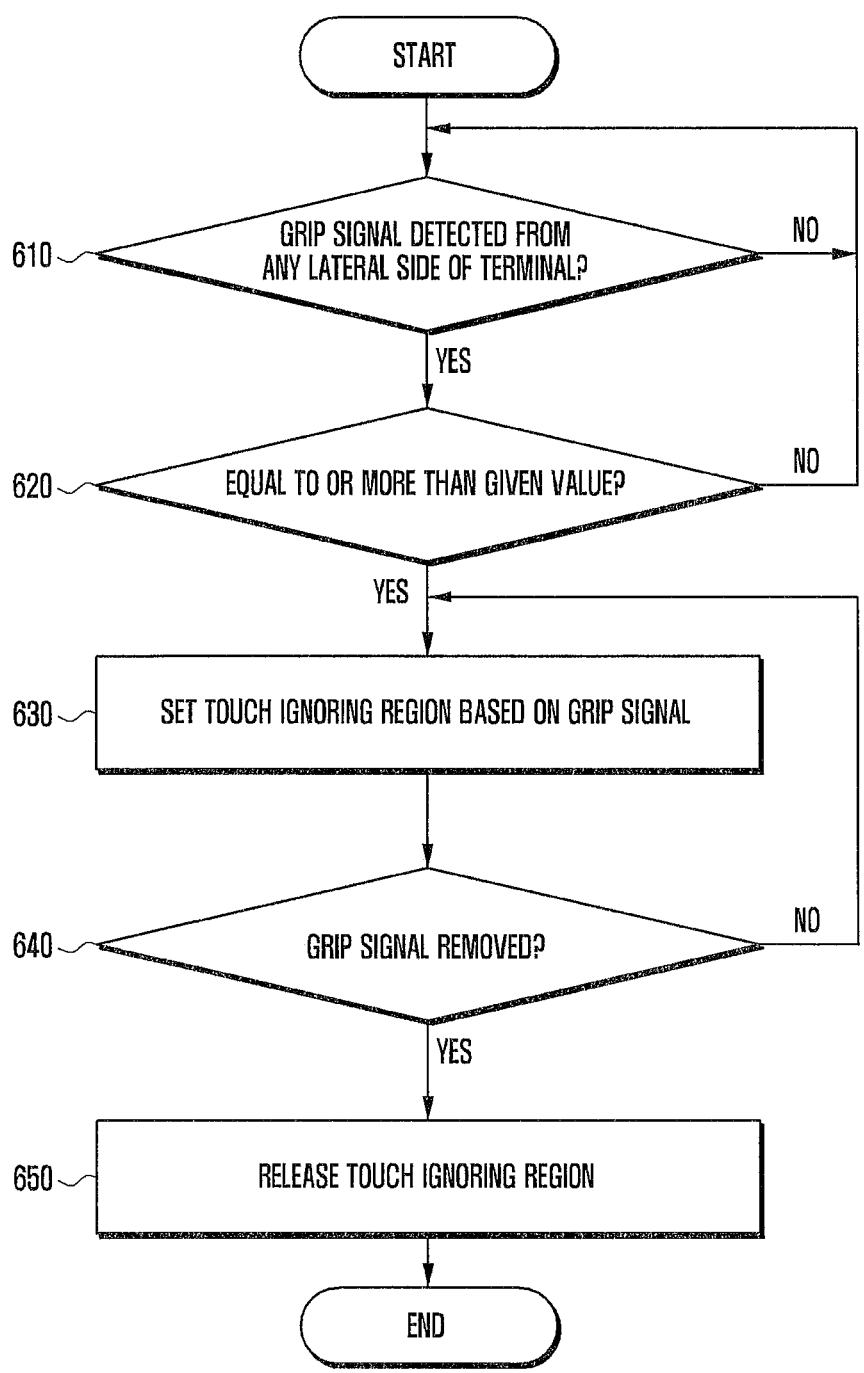
FIG. 6 illustrates a process for setting a touch ignoring region in accordance with an embodiment of the present disclosure.
Figure 7:
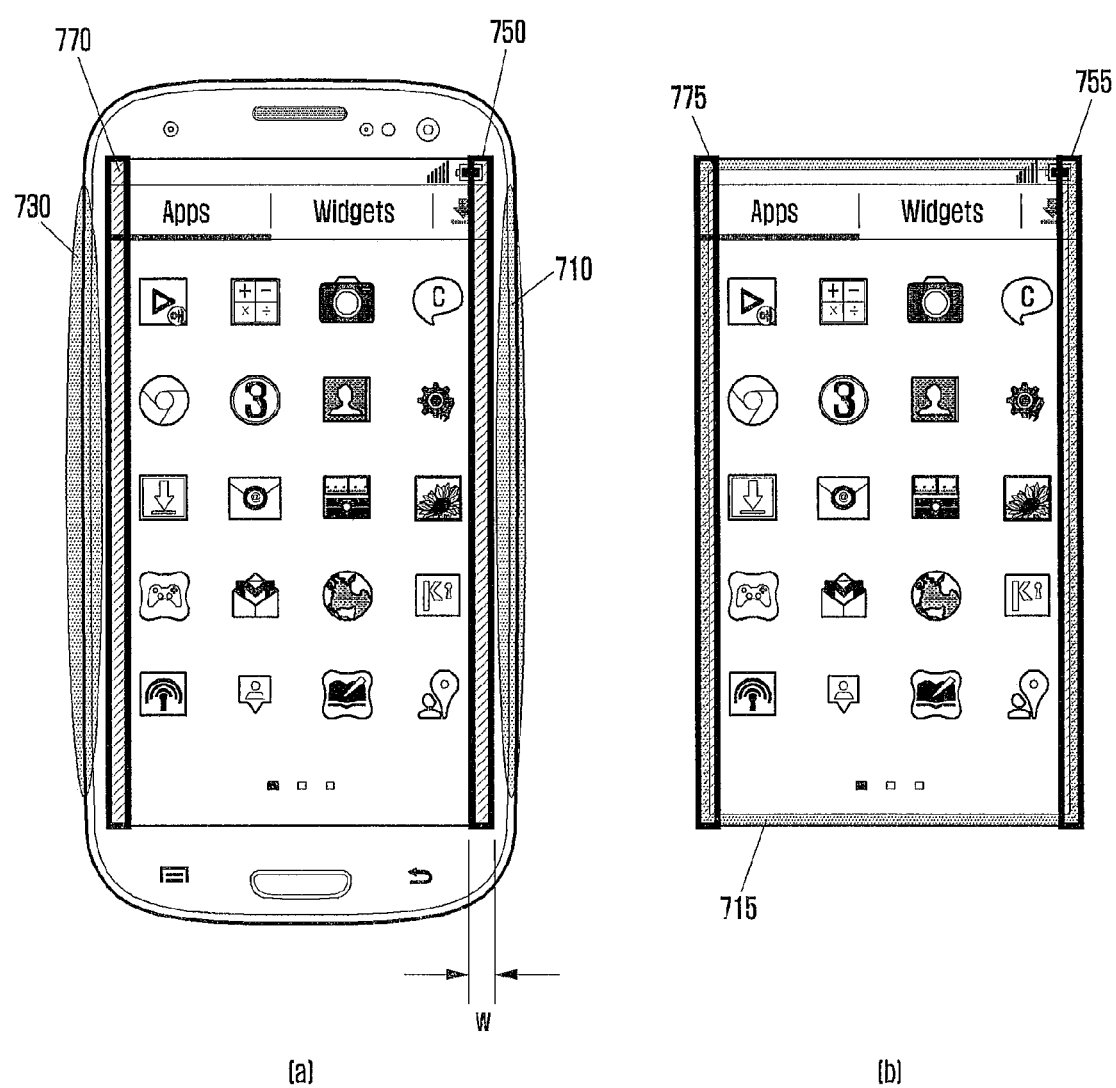
FIG. 7 illustrates a screenshot showing a mobile terminal in which a touch ignoring region is set in accordance with an embodiment of the present disclosure.

FIG. 6 illustrates a process for setting a touch ignoring region in accordance with an embodiment of the present disclosure. FIG. 7 illustrates a screenshot showing a mobile terminal in which a touch ignoring region is set in accordance with an embodiment of the present disclosure.

Referring to FIGS. 3, 6 and 7, the display unit 151 of the mobile terminal 100 has the touch screen on which any information such as an image is displayed. A touch on the touch screen by a pointer creates a touch signal. This pointer may be, but not limited to, a user's finger or a stylus pen.

The mobile terminal 100 determines whether the mobile terminal 100 is gripped by a user's hand. A grip of the mobile terminal 100 means in general that a user's hand simultaneously touches both lateral sides, confronting each other, of the mobile terminal 100 as shown in FIG. 7. However, this is an example only and not to be considered as a limitation. For example, a grip of the mobile terminal 100 may include any situation in which a user's hand simultaneously touches two or more continuous lateral sides, e.g., the left side and the bottom side, of the mobile terminal 100. Additionally, any situation in which a part of the rear side of the mobile terminal 100 is touched or in a state of proximity touch by a user's palm while both lateral sides are touched by a user's hand may be considered as a grip of the mobile terminal 100. In some embodiments, any situation in which a part of the rear side of the mobile terminal 100 is touched while one or two continuous lateral sides of the mobile terminal is touched may be also considered as a grip of the mobile terminal 100.

As shown in section (a) of FIG. 7, sensor units 710 and 730 of the mobile terminal 100 may detect a grip signal from at least one lateral side of the mobile terminal 100 at operation 610. Namely, the sensor units 710 and 730 may detect whether at least one lateral side of the mobile terminal 100 is touched by a user's hand or the like. Although section (a) of FIG. 7 shows that the sensor units 710 and 730 are respectively disposed at the left and right sides of the mobile terminal 100, the sensor units 710 and 730 may be alternatively disposed at all lateral sides of the mobile terminal 100 and further disposed at the rear side of the mobile terminal 100.

When grip signal is detected by the sensor units 710 and 730, the control unit 180 may determine that the mobile terminal 100 is gripped by a user's hand or the like. In some embodiments, when a grip signal is detected from only one lateral side of the mobile terminal 100, the control unit 180 may determine that the mobile terminal 100 is gripped. Alternatively, when a grip signal is simultaneously detected from both confronting lateral sides of the mobile terminal 100, the control unit 180 may determine that the mobile terminal 100 is gripped. Alternatively, when a grip signal is simultaneously detected from both lateral sides and the rear side of the mobile terminal 100 or from one lateral side and the rear side of the mobile terminal 100, the control unit 180 may determine that the mobile terminal 100 is gripped.

In some embodiments, as shown in section (b) of FIG. 7, the sensor unit 715 may be further disposed along a peripheral zone of the display unit 151. In this embodiment, the sensor unit 715 may detect whether at least a part of the peripheral zone of the display unit 151 is touched. If a grip signal is detected by the sensor unit 715, the control unit 180 may determine that a grip happens by a user's hand or the like. Although not shown, the sensor unit 715 may be disposed only at a part of the peripheral zone of the display unit 151.

In some embodiments, a grip signal detected by the sensor unit 715 may result from a proximity touch. Namely, when sensor unit 715 is disposed along the peripheral zone of the display unit 151, the sensor unit 715 may detect a grip signal when a proximity touch happens on a part of the peripheral zone of the display unit 151. In this embodiment, only when a proximity touch happens within a given distance, it may be determined that the mobile terminal 100 is gripped.

In some embodiments, when a contact touch is detected from any lateral side of the mobile terminal 100 and further when a proximity touch is detected from a part, corresponding to a contact touch detected part, of the peripheral zone of the display unit 151, it may be determined that the mobile terminal 100 is gripped.

At operation 620, the control unit 180 may determine whether any value of a grip signal is equal to or greater than a predefined value. If any value of a grip signal is smaller than a predefined value, the control unit 180 may determine that the mobile terminal 100 is not gripped.

For example, the control unit 180 may determine whether the strength of a grip signal is equal to or greater than a given strength. Alternatively, the control unit 180 may determine whether the input duration of a grip signal is equal to or greater than a given time. If a grip signal is a weak or short-lived signal, it may be considered that simple contact happens rather than a grip. Therefore, if the strength of a grip signal is smaller than a given strength, or if the input duration of a grip signal is smaller than a given time, the control unit 180 may determine that the mobile terminal 100 is not gripped. Additionally, when sensor unit can detect a proximity touch as discussed above, a grip of the mobile terminal 100 may be determined only when a proximity touch is detected within a given distance.

Thereafter, at operation 630, the control unit 180 may set touch ignoring regions 750, 770, 755 and 775 on the touch screen, based on the detected grip signal.

When grip signal is detected from one lateral side of the mobile terminal 100, the control unit 180 may set the touch ignoring regions 750, 770, 755 and 775 at a specific peripheral zone of the touch screen corresponding to a specific lateral side from which a grip signal is detected. For example, when a grip signal is detected from the left and right sides of the mobile terminal 100 as shown in FIG. 7, the control unit 180 may set the touch ignoring regions 750, 770, 755 and 775 including a predefined width (w) at the left and right peripheral zones of the touch screen.

In some embodiments, the width (w) of the touch ignoring regions 750, 770, 755 and 775 may be defined by a user's input. Additionally, the width (w) of the touch ignoring regions 750, 770, 755 and 775 may be varied according to the strength of a grip signal. For example, if a grip signal has a greater strength, the width (w) of the touch ignoring regions 750, 770, 755 and 775 may be increased accordingly.

In some embodiments, the control unit 180 may set the touch ignoring region only at a specific zone of the touch screen corresponding to a specific portion from which a grip signal is detected. For example, if a grip signal is detected only from a lower portion of the sensor unit 730 disposed at the left side of the mobile terminal 100, the touch ignoring region including a predefined width may be set accordingly only at the left and lower zone of the touch screen.

Thereafter, at operation 640, the control unit 180 may determine whether the detected grip signal is removed, namely, whether the mobile terminal 100 is not gripped any more. When there is no occurrence of a user's grip, there is not much possibility of any unintended touch. Therefore, in this embodiment, all regions of the touch screen may be set to be touchable without any touch ignoring region.

When no grip signal is detected any more from the sensor units 710, 730 and 715, the control unit 180 may determine that a grip of the mobile terminal 100 is removed.

When grip signal is removed, the control unit 180 may release the touch ignoring regions from the touch screen at operation 650.

Now, one embodiment for setting the touch ignoring regions of the mobile terminal according to a grip signal will be described in detail.

Figure 8:
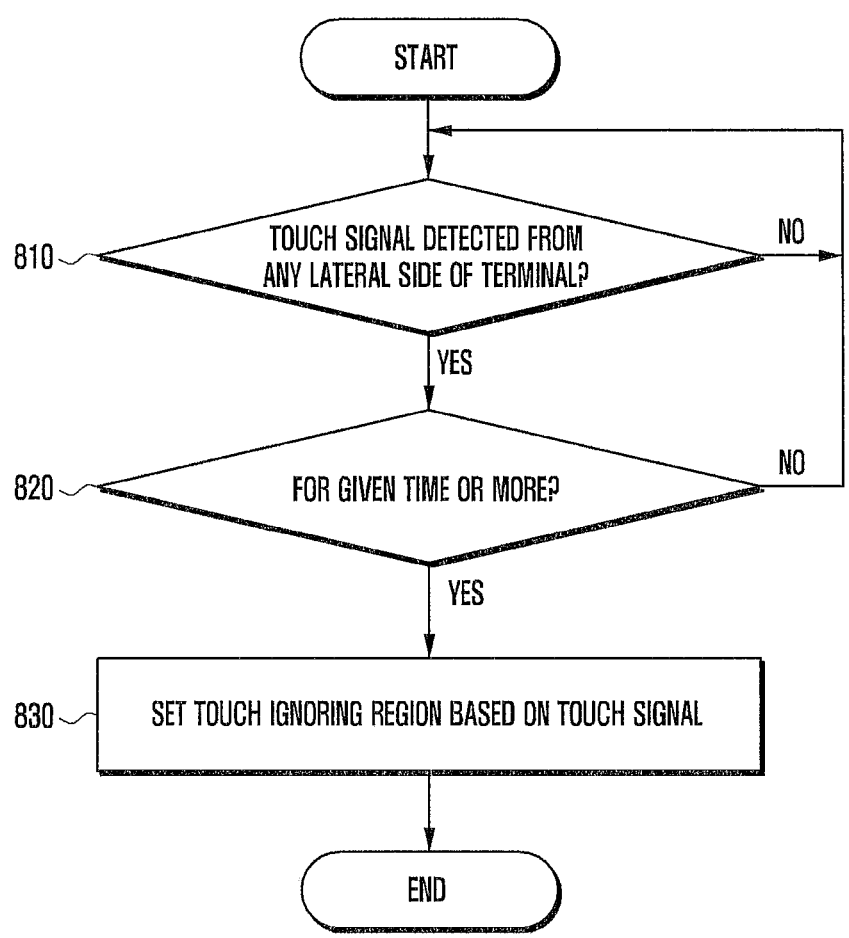
FIG. 8 illustrates a process for setting a touch ignoring region in accordance with another embodiment of the present disclosure.
Figure 9:
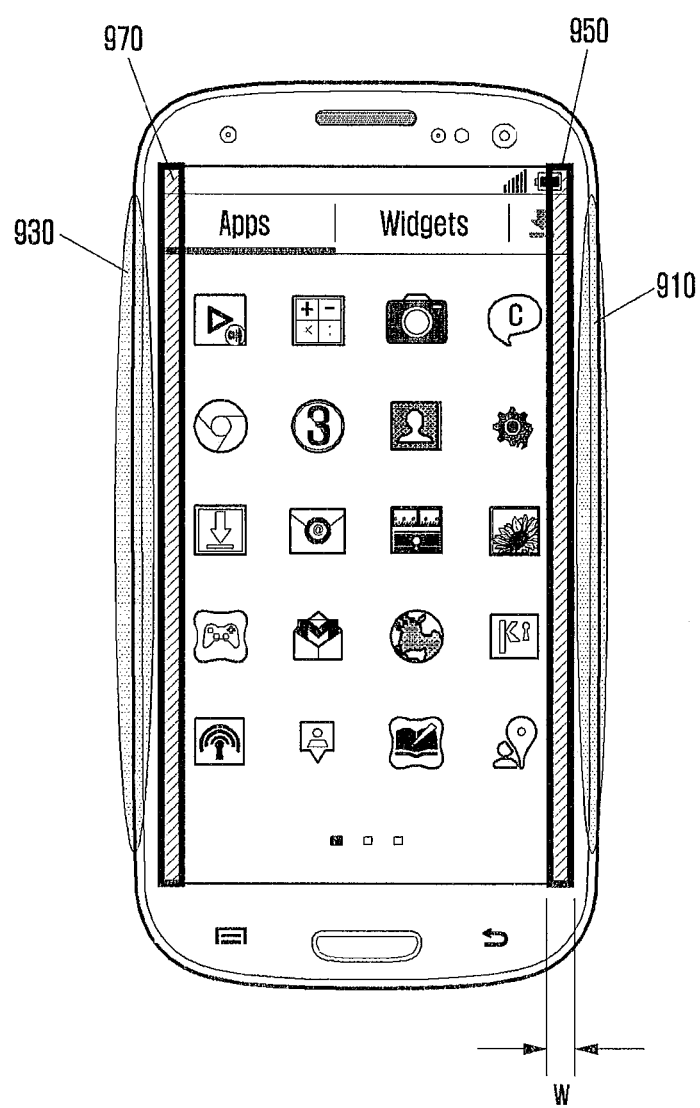
FIG. 9 illustrates a screenshot showing a mobile terminal in which a touch ignoring region is set in accordance with another embodiment of the present disclosure.

FIG. 8 illustrates a process for setting a touch ignoring region in accordance with another embodiment of the present disclosure. FIG. 9 illustrates a screenshot showing a mobile terminal in which a touch ignoring region is set in accordance with another embodiment of the present disclosure.

Referring to FIGS. 3, 8 and 9, the mobile terminal 100 may include grip sensors 910 and 930, which may be disposed at one or more lateral sides or the rear side of the mobile terminal 100 in order to be able to determine whether the mobile terminal 100 is gripped. In some embodiments, the grip sensors 910 and 930 may be touch sensors. For example, if the lateral side of rear side of the mobile terminal 100 is touched by a user's hand, the grip sensors 910 and 930 may be configured to convert a pressure applied to the lateral side or a variation of capacitance on the lateral side into an electric signal. Further, the grip sensors 910 and 930 may be configured to detect the location and area of touch.

At operation 810, the grip sensors 910 and 930 may detect a touch signal from at least one lateral side of the mobile terminal 100. Namely, the grip sensors 910 and 930 may detect whether at least one lateral side of the mobile terminal 100 is touched by a user's hand or the like. Although FIG. 9 shows that the grip sensors 910 and 930 are respectively disposed at the left and right sides of the mobile terminal 100, the grip sensors 910 and 930 may be alternatively disposed at all lateral sides of the mobile terminal 100.

When touch signal is detected by the grip sensors 910 and 930 disposed at one or more lateral sides of the mobile terminal 100, the control unit 180 may determine that the mobile terminal 100 is gripped by a user's hand or the like.

Like an example shown in section (b) of FIG. 7, the grip sensors 910 and 930 may be further disposed along a peripheral zone of the display unit 151. In this embodiment, when a part of the peripheral zone of the display unit 151 is touched by a user's hand or the like, the grip sensors 910 and 930 may detect a touch signal and notify the control unit 180 that a touch signal has been detected. Then, based on the touch signal received from the grip sensors 910 and 930, the control unit 180 may determine that the mobile terminal 100 is gripped, and further detect the location and area of a grip.

In some embodiments, a touch signal detected by the grip sensors 910 and 930 may result from a proximity touch. Namely, like a proximity sensor, the grip sensors 910 and 930 may recognize a proximity touch. For example, when grip sensors 910 and 930 are disposed along the peripheral zone of the display unit 151, the control unit 180 may determine a grip of the mobile terminal 100 when a proximity touch happens on a part of the peripheral zone of the display unit 151. In this embodiment, only when a proximity touch happens within a given distance, it may be determined that the mobile terminal 100 is gripped. In some embodiments, when a proximity touch is detected by any proximity sensor disposed separately on or near the display unit 151, and when a contact touch on the lateral sides of the mobile terminal 100 is detected by the grip sensors 910 and 930, it may be determined that the mobile terminal 100 is gripped.

In some embodiments, the grip sensors 910 and 930 may be disposed at the rear side of the mobile terminal 100, detect whether the rear side of the mobile terminal 100 is gripped by a user's hand or the like, and transmit an input signal to the control unit 180. In this embodiment, the grip sensors 910 and 930 may be formed of a proximity sensor and determine whether any object such as a user's hand is detected within a given distance from the rear side of the mobile terminal 100. In some embodiments, when a touch signal is received from the grip sensors 910 and 930 disposed at the lateral sides of the mobile terminal 100 while a signal is received from at least a part of the grip sensors 910 and 930 disposed at the rear side of the mobile terminal 100, the control unit 180 may determine that a grip of the mobile terminal 100 happens.

At operation 820, the control unit 180 may determine whether a touch signal is received from any lateral side of the mobile terminal 100 or from a part of the peripheral zone of the display unit 151 for a given time or more. If the input duration of a touch signal is smaller than a given time, the control unit 180 may determine that the mobile terminal 100 is not gripped.

In an embodiment with a shorter-lived touch signal, it may be considered that simple contact happens rather than a grip. Therefore, if a touch signal is received for a shorter time than a given time, the control unit 180 may determine that the mobile terminal 100 is not gripped.

Thereafter, at operation 830, the control unit 180 may set touch ignoring regions 950 and 970 on the touch screen, based on the detected touch signal.

Namely, when touch signal is detected from any lateral side of the mobile terminal 100 or the peripheral zone of the display unit 151, the control unit 180 may set the touch ignoring regions 950 and 970 at a specific peripheral zone of the touch screen corresponding to the location of a touch signal. Referring to FIG. 9, since a touch signal is detected from the left and right sides of the mobile terminal 100, the control unit 180 may set the touch ignoring regions 950 and 970 including a predefined width (w) at the left and right peripheral zones of the touch screen. This width (w) of the touch ignoring regions 950 and 970 may be defined by a user's input.

Although not shown, like the above-discussed operations 640 and 650 in FIG. 6, the control unit 180 may determine whether the detected touch signal is removed, and if so, the control unit 180 may release the touch ignoring regions 950 and 970 from the touch screen.

Figure 10:
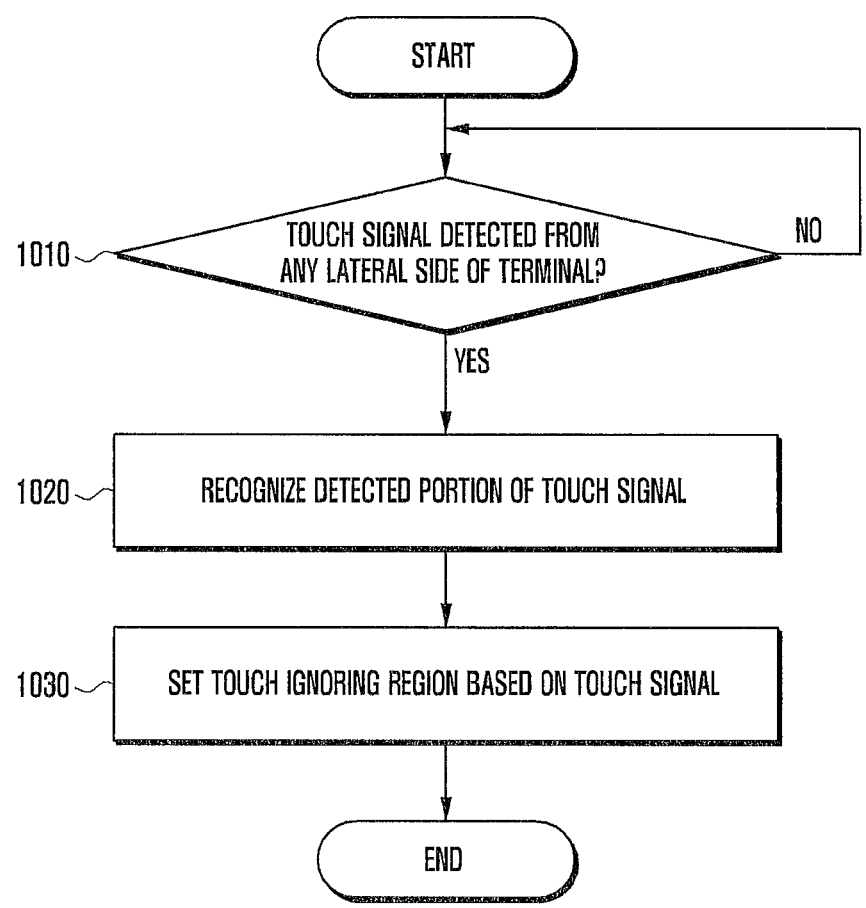
FIG. 10 illustrates a process for setting a touch ignoring region in accordance with still another embodiment of the present disclosure.
Figure 11:
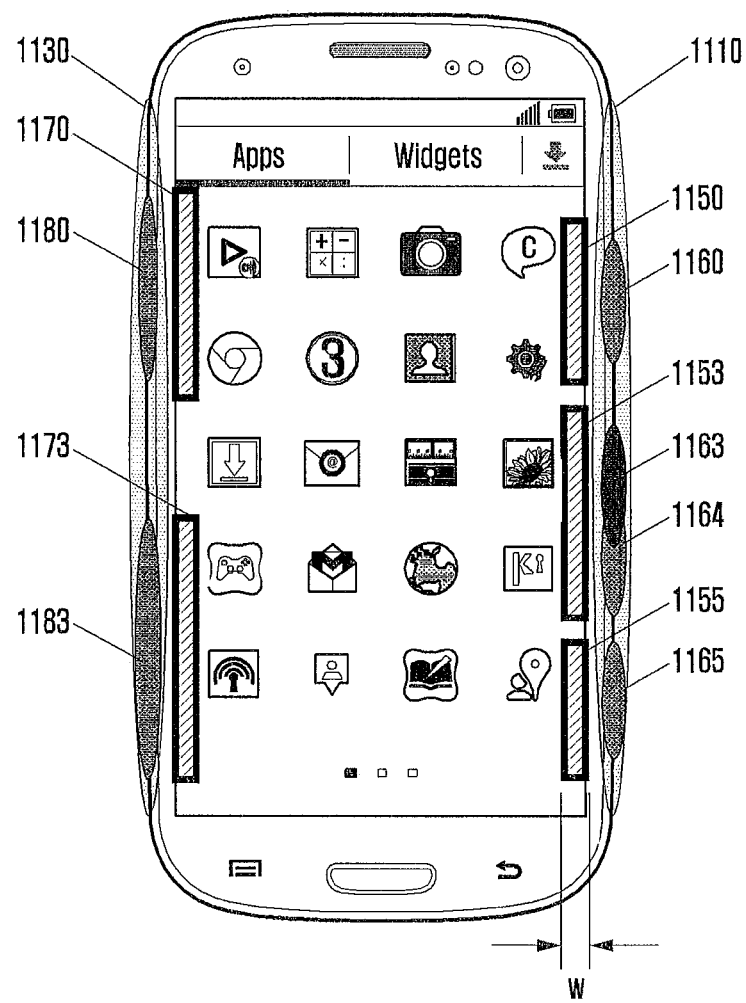
FIG. 11 illustrates a screenshot showing a mobile terminal in which a touch ignoring region is set in accordance with still another embodiment of the present disclosure.

FIG. 10 illustrates a process for setting a touch ignoring region in accordance with still another embodiment of the present disclosure. FIG. 11 illustrates a screenshot showing a mobile terminal in which a touch ignoring region is set in accordance with still another embodiment of the present disclosure.

Referring to FIGS. 3, 10 and 11, the mobile terminal 100 may include grip sensors 1110 and 1130, which may be disposed at one or more lateral sides or the rear side of the mobile terminal 100 in order to be able to determine whether the mobile terminal 100 is gripped. In some embodiments, the grip sensors 1110 and 1130 may be touch sensors. The grip sensors 1110 and 1130 may be configured to detect the location and area of touch.

At operation 1010, the grip sensors 1110 and 1130 may detect a touch signal from at least one lateral side of the mobile terminal 100. Since this operation has been already discussed above with reference to FIGS. 8 and 9, a detailed description will be omitted.

Although not shown, like the above-discussed operation 820 in FIG. 8, the control unit 180 may determine whether a touch signal is received from any lateral side of the mobile terminal 100 for a given time or more. If so, the control unit 180 may perform operations 1020 and 1030 which will be discussed below. If the input duration of a touch signal is smaller than a given time, the control unit 180 may determine that the mobile terminal 100 is not gripped.

At operation 1020, the control unit 180 may recognize a specific portion from which a touch signal is detected by the grip sensors 1110 and 1130. Namely, since the grip sensors 1110 and 1130 may detect the location and area of touch, the control unit 180 may determine the location and area where a touch signal is entered on the lateral side of the mobile terminal 100. In some embodiments, the grip sensors 1110 and 1130 are composed of a plurality of sensors. In this embodiment, identifying a specific sensor that detects a touch signal may allow recognizing a specific portion from which a touch signal is detected.

For example, when user grips the mobile terminal 100 by the left hand, the left grip sensor 1130 of the mobile terminal 100 may detect a touch signal from an upper portion 1180 and a lower portion 1183. Further, the right grip sensor 1110 of the mobile terminal 100 may detect a touch signal from four portions 1160, 1163, 1164 and 1165 corresponding to four fingers. Then the control unit 180 may receive a detected signal from the grip sensors 1110 and 1130 and calculate the area of each portion from which a touch signal is detected. In some embodiments, this calculation may be performed by the grip sensors 1110 and 1130 rather than the control unit 180.

In some embodiments, the grip sensors 1110 and 1130 may be further disposed along a peripheral zone of the display unit 151. In this embodiment, when a part of the peripheral zone of the display unit 151 is touched by a user's hand or the like, the grip sensors 1110 and 1130 may detect a touch signal and notify the control unit 180 that a touch signal has been detected. Also, since the grip sensors 1110 and 1130 may detect the location and area of touch, the control unit 180 may determine the location and area where a touch signal is entered on the peripheral zone of the display unit 151.

Additionally, the grip sensors 1110 and 1130 may recognize a proximity touch. For example, when grip sensors 1110 and 1130 are disposed along the peripheral zone of the display unit 151, the control unit 180 may determine the location and area of a portion where a proximity touch happens on the peripheral zone of the display unit 151.

Thereafter, at operation 1030, the control unit 180 may set touch ignoring regions 1150, 1153, 1155, 1170 and 1173 on the touch screen, based on the detected touch signal.

Namely, when touch signal is detected from any lateral side of the mobile terminal 100, the control unit 180 may determine specific portions 1160, 1163, 1164, 1165, 1180 and 1183 from which the touch signal is detected, and then set the touch ignoring regions 1150, 1153, 1155, 1170 and 1173 including a predefined width (w) at parts of the peripheral zone of the touch screen corresponding to the determined portions. This width (w) of the touch ignoring regions 1150, 1153, 1155, 1170 and 1173 may be defined by a user's input.

Referring to FIG. 11, the control unit 180 may recognize a touch signal from specific portions 1180 and 1183 on the left side and specific portions 1160, 1163, 1164 and 1165 on the right side of the mobile terminal 100. Then, based on this recognition, the control unit 180 may set the touch ignoring regions 1150, 1153, 1155, 1170 and 1173 on the touch screen corresponding to specific portions 1160, 1163, 1164, 1165, 1180 and 1183 of the touch signal.

In an embodiment, touch ignoring regions 1170 and 1173 may be set at the left peripheral zone of the touch screen in response to respective portions 1180 and 1183 of the left side of the mobile terminal 100 from which a touch signal is detected. Similarly, the touch ignoring regions 1150, 1153 and 1155 may be set at the right peripheral zone of the touch screen in response to respective portions 1160, 1163, 1164 and 1165 of the right side of the mobile terminal 100 from which a touch signal is detected. In this embodiment, very close or overlapped portions 1163 and 1164 may be considered as a single broad portion and thus correspond to a single touch ignoring region 1153.

When touch ignoring regions are set partly and individually as discussed above, unnecessary assignment of the touch ignoring regions may be prevented.

Although not shown, like the above-discussed operations 640 and 650 in FIG. 6, the control unit 180 may determine whether the detected touch signal is removed, and if so, the control unit 180 may release the touch ignoring regions 1150, 1153, 1155, 1170 and 1173 from the touch screen.

Figure 12:
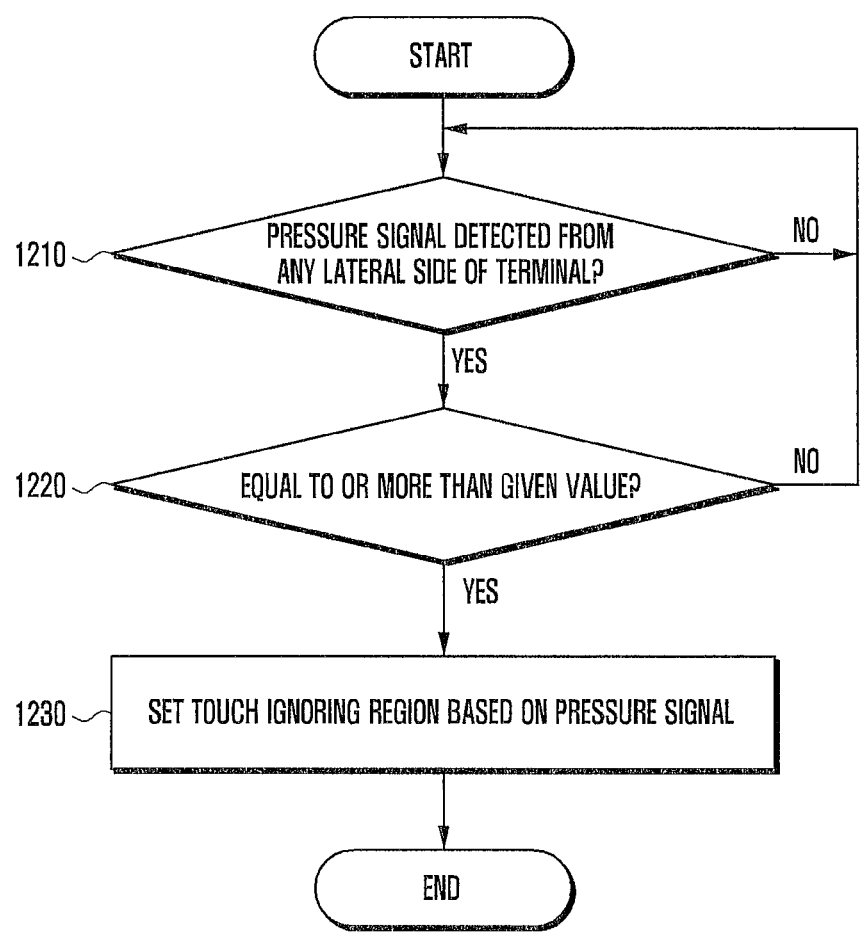
FIG. 12 illustrates a process for setting a touch ignoring region in accordance with yet another embodiment of the present disclosure.
Figure 13:
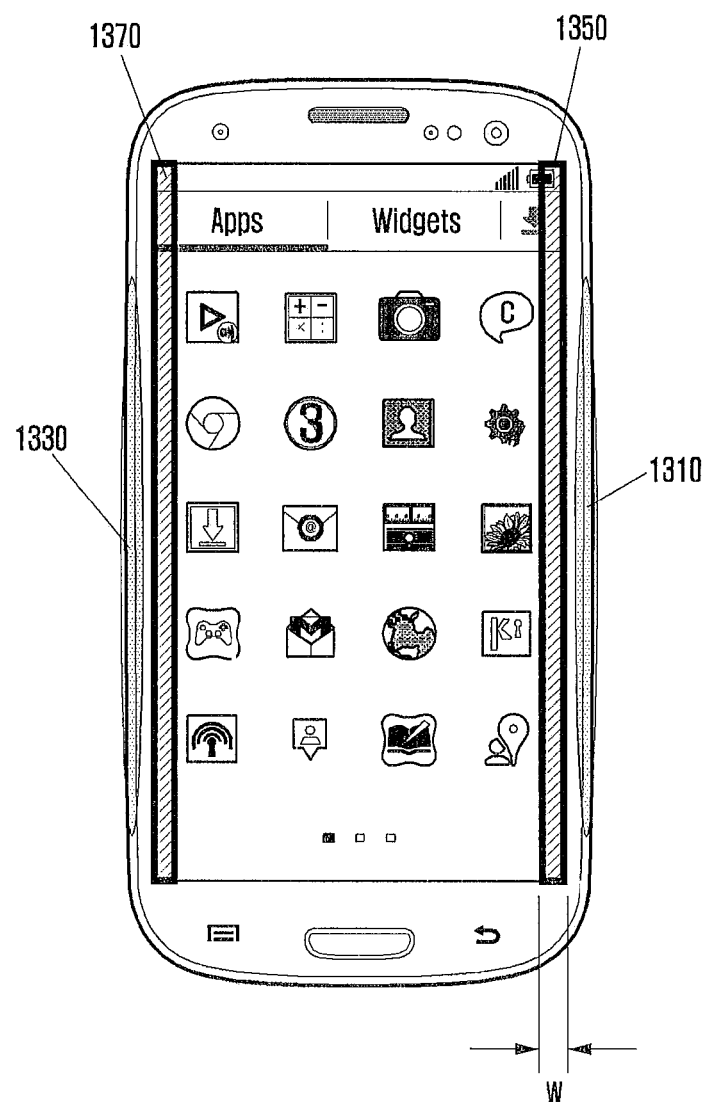
FIG. 13 illustrates a screenshot showing a mobile terminal in which a touch ignoring region is set in accordance with yet another embodiment of the present disclosure.

FIG. 12 illustrates a process for setting a touch ignoring region in accordance with yet another embodiment of the present disclosure. FIG. 13 illustrates a screenshot showing a mobile terminal in which a touch ignoring region is set in accordance with yet another embodiment of the present disclosure.

Referring to FIGS. 3, 12 and 13, the mobile terminal 100 may include pressure sensors 1310 and 1330, which may be disposed at one or more lateral sides of the mobile terminal 100 in order to be able to determine whether the mobile terminal 100 is gripped. The pressure sensors 1310 and 1330 may detect a pressure applied to the lateral sides of the mobile terminal 100. Further, the pressure sensors 1310 and 1330 may detect the size and location of pressure. When a pressure signal is detected, the pressure sensors 1310 and 1330 may convert the pressure signal into an electric signal and transmit it to the control unit 180. Then, based on the size and location of pressure, the control unit 180 may determine whether the mobile terminal 100 is gripped.

At operation 1210, the pressure sensors 1310 and 1330 may detect a pressure signal from at least one lateral side of the mobile terminal 100. Namely, the pressure sensors 1310 and 1330 may detect whether at least one lateral side of the mobile terminal 100 is touched by a user's hand or the like. Although FIG. 13 shows that the pressure sensors 1310 and 1330 are respectively disposed at the left and right sides of the mobile terminal 100, the pressure sensors 1310 and 1330 may be alternatively disposed at all lateral sides of the mobile terminal 100.

For example, when a pressure signal is detected by the pressure sensors 1310 and 1330 disposed at any lateral side of the mobile terminal 100, the control unit 180 may recognize that the mobile terminal 100 is gripped by a user's hand or the like. In some embodiments, when a pressure signal is simultaneously detected from both confronting lateral sides of the mobile terminal 100, the control unit 180 may determine that the mobile terminal 100 is gripped. Alternatively, when a pressure signal is simultaneously detected from two or more continuous lateral sides, e.g., the left and bottom sides, of the mobile terminal 100, the control unit 180 may determine that the mobile terminal 100 is gripped.

Although not shown, like the above-discussed operation 820 in FIG. 8, the control unit 180 may determine whether a pressure signal is detected from the pressure sensors 1310 and 1330 for a given time or more. If so, the control unit 180 may perform operations 1220 and 1230 which will be discussed below. If the input duration of a pressure signal is smaller than a given time, the control unit 180 may determine that the mobile terminal 100 is not gripped.

At operation 1220, the control unit 180 may determine whether a pressure signal detected from any lateral side of the mobile terminal 100 has strength equal to or greater than a given strength. If the strength of a pressure signal is smaller than a given strength, the control unit 180 may determine that the mobile terminal 100 is not gripped.

Namely, if a pressure signal is a weak signal, it may be considered that simple contact happens rather than a grip. Therefore, if the strength of a pressure signal is smaller than a given strength, the control unit 180 may determine that the mobile terminal 100 is not gripped.

Thereafter, at operation 1230, the control unit 180 may set touch ignoring regions 1350 and 1370 on the touch screen, based on the detected pressure signal.

Namely, when pressure signal is detected from any lateral side of the mobile terminal 100, the control unit 180 may set the touch ignoring regions 1350 and 1370 at the peripheral zone of the touch screen near the lateral side of the mobile terminal 100 from which a pressure signal is detected. Referring to FIG. 13, since a pressure signal is detected from the left and right sides of the mobile terminal 100, the control unit 180 may set the touch ignoring regions 1350 and 1370 including a predefined width (w) at the left and right peripheral zones of the touch screen. This width (w) of the touch ignoring regions 1350 and 1370 may be defined by a user's input.

Although not shown, like the above-discussed operations 640 and 650 in FIG. 6, the control unit 180 may determine whether the detected pressure signal is removed, and if so, the control unit 180 may release the touch ignoring regions 1350 and 1370 from the touch screen.

Figure 14:
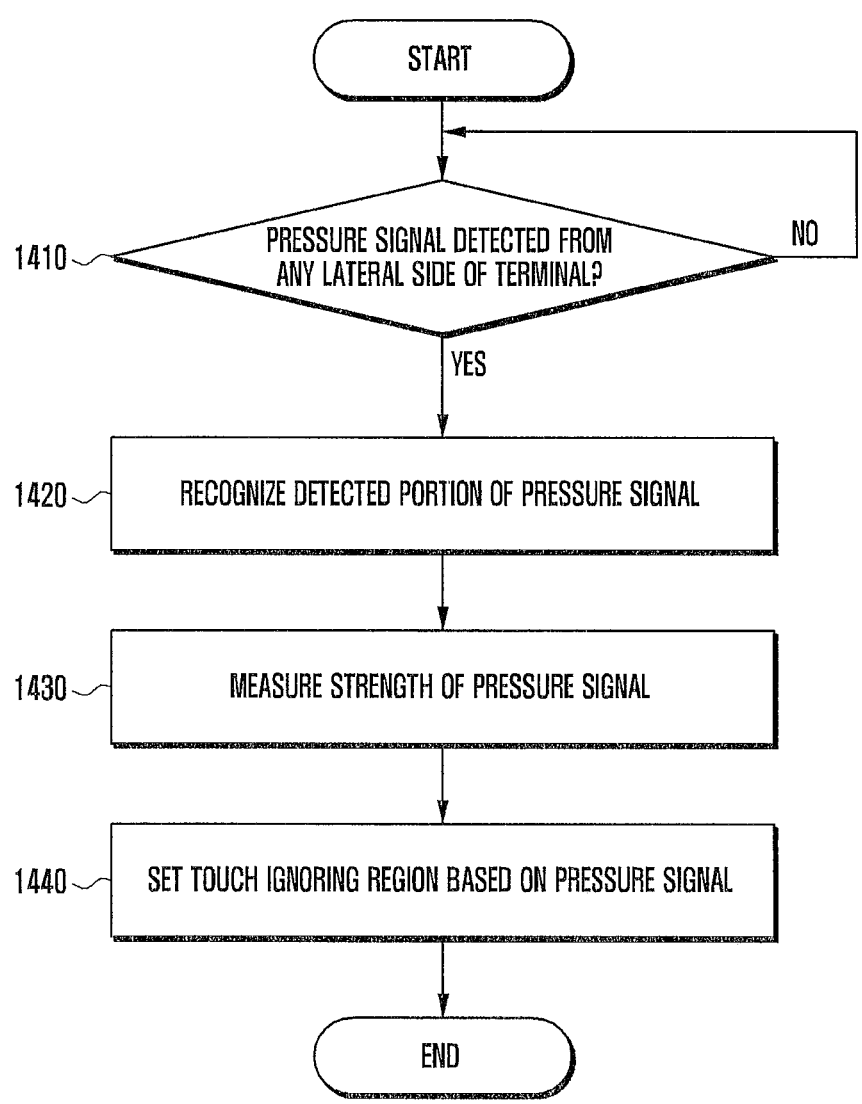
FIG. 14 illustrates a process for setting a touch ignoring region in accordance with further another embodiment of the present disclosure.
Figure 15:
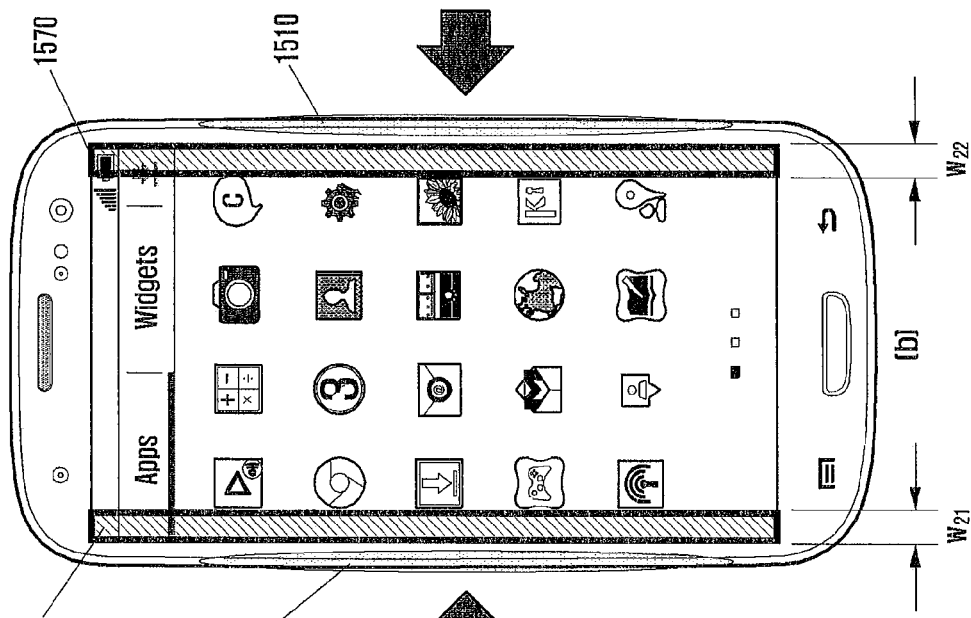
FIGS. 15 to 17 illustrate screenshots showing a mobile terminal in which a touch ignoring region is set in accordance with further another embodiment of the present disclosure.
Figure 15:
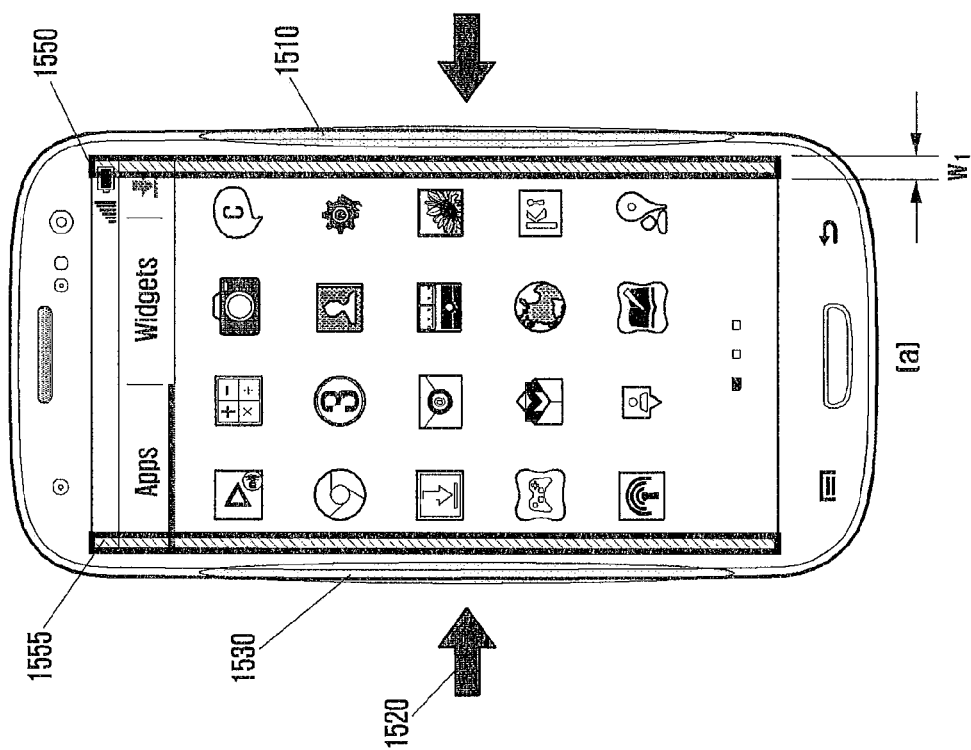
Figure 16:
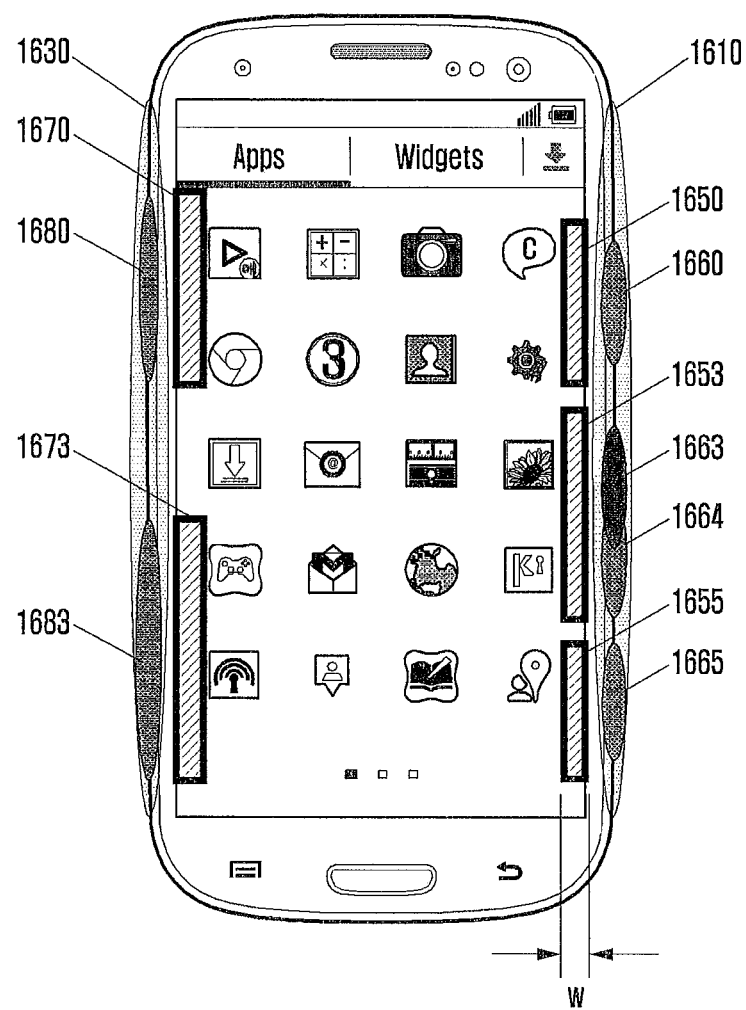
Figure 17:
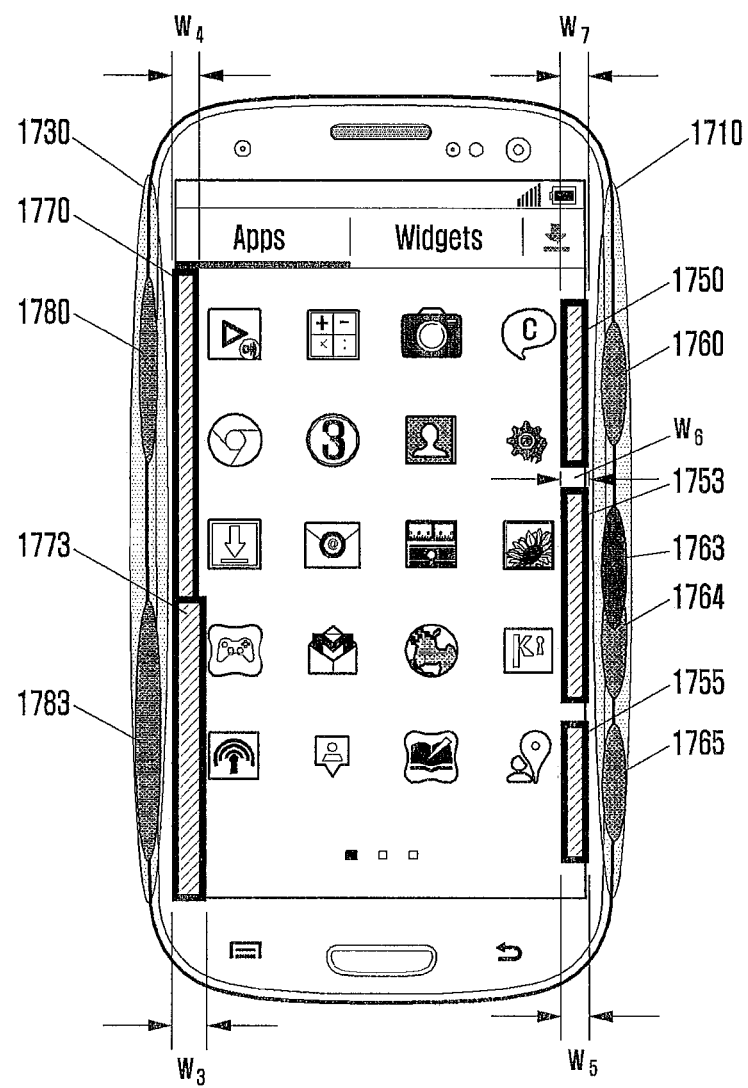

FIG. 14 illustrates a process for setting a touch ignoring region in accordance with further another embodiment of the present disclosure. FIGS. 15 to 17 illustrate screenshots showing a mobile terminal in which a touch ignoring region is set in accordance with further another embodiment of the present disclosure.

Referring to FIGS. 3 and 14 to 17, the mobile terminal 100 may include pressure sensors 1510, 1530, 1610, 1630, 1710 and 1730, which may be disposed at one or more lateral sides of the mobile terminal 100 in order to be able to determine whether the mobile terminal 100 is gripped. The pressure sensors 1510, 1530, 1610, 1630, 1710 and 1730 may further detect the location and size of pressure.

At operation 1410, the pressure sensors may detect a pressure signal from at least one lateral side of the mobile terminal 100. Since this operation has been already discussed above with reference to FIGS. 12 and 13, a detailed description will be omitted.

Although not shown, like the above-discussed operation 820 in FIG. 8, the control unit 180 may determine whether a pressure signal is detected from any lateral side of the mobile terminal 100 for a given time or more. If so, the control unit 180 may perform operations 1420 to 1440 which will be discussed below. If the input duration of a pressure signal is smaller than a given time, the control unit 180 may determine that the mobile terminal 100 is not gripped.

Thereafter, at operation 1420, the control unit 180 may recognize a specific portion from which a pressure signal is detected by the pressure sensors. Namely, since the pressure sensors may detect the location and area of the specific portion, the control unit 180 may determine the location and area where a pressure signal is entered on the lateral side of the mobile terminal 100. In some embodiments, the pressure sensors may be composed of a plurality of sensors. In this embodiment, identifying a specific sensor that detects a pressure signal may allow recognizing a specific portion from which a pressure signal is detected.

For example, referring to FIG. 16, the pressure sensors 1610 and 1630 may be disposed at both lateral sides of the mobile terminal 100. In this embodiment, if a user grips the mobile terminal 100 by the left hand, the left pressure sensor 1630 of the mobile terminal 100 may detect a pressure signal from an upper portion 1680 and a lower portion 1683. Further, the right pressure sensor 1610 of the mobile terminal 100 may detect a pressure signal from four portions 1660, 1663, 1664 and 1665 corresponding to four fingers. Then the control unit 180 may receive a detected pressure signal from the pressure sensors 1610 and 1630, recognize that the pressure signal is detected from specific portions 1680 and 1683 of the left side and specific portions 1660, 1663, 1664 and 1665 of the right side, and calculate the area of each portion. In some embodiments, this calculation may be performed by the pressure sensors 1610 and 1630 rather than the control unit 180.

Thereafter, at operation 1430, the control unit 180 may measure the strength of a pressure signal detected by the pressure sensors.

Referring to FIG. 15, the pressure sensors 1510 and 1530 disposed at the lateral sides of the mobile terminal 100 may detect a pressure signal produced by a user's grip, and the control unit 180 may measure the strength of the detected pressure signal. Alternatively, the pressure sensors 1510 and 1530 may measure the strength of the detected pressure signal and then send a measurement result to the control unit 180. In some embodiments, the pressure sensors may be formed of a plurality of sensors. In this embodiment, the strength of a pressure signal may be measured individually at each sensor.

Although not shown, like the above-discussed operation 1220 in FIG. 12, the control unit 180 may determine whether the detected pressure signal has strength equal to or greater than a given strength, and if so, the control unit 180 may perform operations which will be discussed below. If the strength of a pressure signal is smaller than a given strength, the control unit 180 may determine that the mobile terminal 100 is not gripped.

Operations 1420 and 1430 may be performed together or selectively. Namely, the control unit 180 may measure only the strength of a pressure signal or identify only a specific portion from which a pressure signal is detected. Alternatively, the control unit 180 may identify such a detected portion of a pressure signal and also measure the strength of a pressure signal at each detected portion.

Thereafter, at operation 1440, the control unit 180 may set touch ignoring regions on the touch screen, based on at least one of the detected portion of a pressure signal and the strength of a pressure signal.

FIG. 15 shows a method for setting a touch ignoring region when control unit 180 measures only the strength of pressure signals 1520 and 1560 at operation 1430 without performing operation 1420.

Referring to FIG. 15, at operation 1440, the control unit 180 may set touch ignoring regions 1550, 1555, 1570 and 1575 on the touch screen, based on the strength of the measured pressure signals 1520 and 1560. In this embodiment, the strength of a pressure signal 1520 shown in section (a) of FIG. 15 is smaller than that of a pressure signal 1560 shown in section (b) of FIG. 15. The control unit 180 may set the touch ignoring regions 1550, 1555, 1570 and 1575 including predefined widths at the left and right peripheral zones of the touch screen corresponding to lateral sides of the mobile terminal 100 from which the pressure signals 1520 and 1560 are detected.

In this embodiment, the widths of the touch ignoring regions 1550, 1555, 1570 and 1575 may be set differently according to the strength of a pressure signal. For example, when strength of the pressure signal 1520 is relatively smaller as shown in section (a) of FIG. 15, the width (w1) of the touch ignoring regions 1550 and 1555 may be set narrowly. Similarly, when strength of the pressure signal 1560 is relatively greater as shown in section (b) of FIG. 15, the width (w21, w22) of the touch ignoring regions 1570 and 1575 may be set widely. In other words, if a user strongly grips the mobile terminal 100, a contact area produced by a grip may be increased. Therefore, a greater strength of a pressure signal may be used to set the touch ignoring region with a wider area.

In some embodiments, even in the one mobile terminal 100, the width of each touch ignoring region may be set differently. For example, if the strength of a pressure signal is different from each other at both lateral sides of the mobile terminal 100 shown in section (b) of FIG. 15, the width (w22) of the touch ignoring region 1570 set on the right side may be different from the width (w21) of the touch ignoring region 1575 set on the left side.

The width of the touch ignoring region depending on the strength of a pressure signal may be stored as a predefined value or defined by a user's input. Additionally, the width of the touch ignoring region may be defined stepwise. For example, if the strength of a pressure signal is equal to or smaller than the first threshold value ($P_1$), the width of the touch ignoring region has the first value ($D_1$). If the strength of a pressure signal is greater than the first threshold value ($P_1$) and equal to or smaller than the second threshold value ($P_2$), the width of the touch ignoring region has the second value ($D_2$). If the strength of a pressure signal is greater than the second threshold value ($P_2$), the width of the touch ignoring region has the third value ($D_3$).

FIG. 16 shows a method for setting a touch ignoring region when control unit 180 identifies only the detected portion of a pressure signal at operation 1420 without performing operation 1430.

Referring to FIG. 16, at operation 1440, the control unit 180 may set touch ignoring regions 1650, 1653, 1655, 1670 and 1673 on the touch screen, based on the detected portion of a pressure signal. In this embodiment, all the touch ignoring regions 1650, 1653, 1655, 1670 and 1673 may have the same predefined width (w).

In an embodiment, the control unit 180 may recognize that touch signals are detected from specific portions 1680 and 1683 on the left side of the mobile terminal 100 and from specific portions 1660, 1663, 1664 and 1665 on the right side, and then set the touch ignoring regions 1650, 1653, 1655, 1670 and 1673 on the touch screen corresponding to such detected portions 1660, 1663, 1664, 1665, 1680 and 1683.

FIG. 17 shows a method for setting a touch ignoring region when control unit 180 identifies the detected portion of a pressure signal at operation 1420 and also measures the strength of a pressure signal at each detected portion at operation 1430.

Referring to FIG. 17, at operation 1420, the control unit 180 may recognize specific portions 1760, 1763, 1764, 1765, 1780 and 1783 from which a pressure signal is detected. Then, at operation 1430, the control unit 180 may measure the strength of a pressure signal at each of the detected portions 1760, 1763, 1764, 1765, 1780 and 1783. Thereafter, at operation 1440, the control unit 180 may set touch ignoring regions 1750, 1753, 1755, 1770 and 1773 on the touch screen, based on the detected portions and the measured strength.

In an embodiment, pressure signals may be detected from specific portions 1760, 1763, 1764, 1765, 1780 and 1783 on the left and right sides of the mobile terminal 100, and also such pressure signals may be different in strength from each other. In this embodiment, the control unit 180 may set the touch ignoring regions 1750, 1753, 1755, 1770 and 1773 on the touch screen corresponding to the detected portions 1760, 1763, 1764, 1765, 1780 and 1783. The widths (w3, w4, w5, w6, w7) of the touch ignoring regions 1750, 1753, 1755, 1770 and 1773 may be set differently depending on the strength of each pressure signal.

For example, if a pressure signal detected from a lower portion of the left side has the greatest strength, the width ($w_3$) of the corresponding touch ignoring region 1773 is greater than the width ($w_4$, $w_5$, $w_6$, $w_7$) of the other touch ignoring regions 1750, 1753, 1755 and 1770.

When touch ignoring regions are set partly and individually as discussed above, unnecessary assignment of the touch ignoring regions may be prevented.

Although not shown, like the above-discussed operations 640 and 650 in FIG. 6, the control unit 180 may determine whether the detected pressure signal is removed, and if so, the control unit 180 may release the touch ignoring regions from the touch screen.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for controlling a mobile terminal comprising a touch screen, the method comprising:
   detecting a grip signal of a user and a pressure signal of the grip, from at least one lateral side of the mobile terminal;
   recognizing a plurality of specific portions of the lateral side of the mobile terminal where a touch signal is detected;
   setting a touch ignoring region based on the plurality of specific portions, wherein the touch ignoring region is only set to areas adjacent to the plurality of specific portions; and
   setting a width of the touch ignoring region based on a strength of the pressure signal,
   wherein the setting the touch ignoring region includes:
     determining whether a value of the grip signal is equal to or greater than a predefined value; and
     if the value of the grip signal is equal to or greater than the predefined value, setting the touch ignoring region based on the grip signal.

2. The method of claim 1, wherein the detecting of the grip signal includes detecting a touch signal from the lateral side of the mobile terminal.

3. The method of claim 2, wherein the setting of the touch ignoring region includes:

determining whether the touch signal is received from the lateral side of the mobile terminal for a given time or more; and if the touch signal is received for the given time or more, setting the touch ignoring region based on the touch signal.

4. The method of claim 1, wherein the setting of the touch ignoring region includes:

measuring the strength of the pressure signal;

determining whether the measured strength is equal to or greater than a given strength; and if the measured strength is equal to or greater than the given strength, setting the touch ignoring region based on the pressure signal.

5. The method of claim 1, wherein the setting of the touch ignoring region includes:

measuring the strength of the pressure signal at each of the plurality of specific portions; and setting the width of the touch ignoring region based on the strength of the pressure signal at each of the plurality of specific portions adjacent to each of the areas of the touch ignoring region.

6. The method of claim 1, further comprising:

determining whether the grip signal is removed; and if the grip signal is removed, releasing the touch ignoring region.

7. The method of claim 1, wherein the detecting of the grip signal includes detecting the grip signal from a peripheral zone of the touch screen of the mobile terminal.

8. A mobile terminal comprising:

a display unit including a touch screen;

a sensor unit configured to detect a grip signal of a user and a pressure signal of the grip, from at least one lateral side of the mobile terminal; and a control unit configured to recognize a plurality of specific portions of the lateral side of the mobile terminal where a touch signal is detected;

set a touch ignoring region based on the plurality of specific portions, wherein the touch ignoring region is only set to areas adjacent to the plurality of specific portions; and set a width of the touch ignoring region based on a strength of the pressure signal, wherein the control unit setting the touch ignoring region further comprises the control unit configured to:

determine whether a value of the grip signal is equal to or greater than a predefined value, and if the value of the grip signal is equal to or greater than the predefined value, set the touch ignoring region based on the grip signal.

9. The mobile terminal of claim 8, wherein the control unit is further configured to:

determine whether a value of the grip signal is equal to or greater than a predefined value, and if the value of the grip signal is equal to or greater than the predefined value, set the touch ignoring region based on the grip signal.

10. The mobile terminal of claim 8, wherein the control unit is further configured to detect a touch signal from the lateral side of the mobile terminal.

11. The mobile terminal of claim 10, wherein the control unit is further configured to:

determine whether the touch signal is received from the lateral side of the mobile terminal for a given time or more, and if the touch signal is received for the given time or more, set the touch ignoring region based on the touch signal.

12. The mobile terminal of claim 8, wherein the control unit is further configured to:

determine whether the strength of the pressure signal is equal to or greater than a given strength, and if the strength of the pressure signal is equal to or greater than the given strength, set the touch ignoring region based on the pressure signal.

13. The mobile terminal of claim 8, wherein the control unit is further configured to:

recognize a specific portion from which the pressure signal is detected, measure the strength of the pressure signal, and set the touch ignoring region based on both the specific portion and the strength of the pressure signal.

14. The mobile terminal of claim 8, wherein the control unit is further configured to:

determine whether the grip signal is removed, and if the grip signal is removed, release the touch ignoring region.

15. The mobile terminal of claim 8, wherein the sensor unit is disposed along a peripheral zone of the touch screen and configured to detect the grip signal from the peripheral zone.

* * * * *